United States Patent
Benjamin et al.

(10) Patent No.: US 11,065,960 B2
(45) Date of Patent: Jul. 20, 2021

(54) CURVED VEHICLE DISPLAYS

(71) Applicant: CORNING INCORPORATED, Corning, NY (US)

(72) Inventors: Jeffrey Michael Benjamin, Horseheads, NY (US); Jordon Thomas Boggs, Wellsboro, PA (US); Atul Kumar, Horseheads, NY (US); Cheng-Chung Li, Painted Post, NY (US); Yawei Sun, Elmira, NY (US)

(73) Assignee: CORNING INCORPORATED, Corning, NY (US)

(*) Notice: Subject to any disclaimer, the term of this patent is extended or adjusted under 35 U.S.C. 154(b) by 247 days.

(21) Appl. No.: 16/126,320

(22) Filed: Sep. 10, 2018

(65) Prior Publication Data
US 2019/0077262 A1    Mar. 14, 2019

Related U.S. Application Data

(60) Provisional application No. 62/558,337, filed on Sep. 13, 2017.

(51) Int. Cl.
*B60K 35/00* (2006.01)
*B32B 1/00* (2006.01)
(Continued)

(52) U.S. Cl.
CPC ............ *B60K 35/00* (2013.01); *B32B 1/00* (2013.01); *B32B 7/12* (2013.01); *B32B 17/06* (2013.01);
(Continued)

(58) Field of Classification Search
CPC .. B60K 35/00; B32B 1/00; B32B 7/00; B32B 7/10; B32B 7/12; B32B 17/00;
(Continued)

(56) References Cited

U.S. PATENT DOCUMENTS 4,455,338 A    6/1984   Henne
4,899,507 A    2/1990   Mairlot
(Continued)

FOREIGN PATENT DOCUMENTS

CN    203825589 U    9/2014
CN    102566841 B    4/2015
(Continued)

OTHER PUBLICATIONS

International Search Report and Written Opinion PCT/US2018/050881 dated Feb. 12, 2019, 28 Pgs.
(Continued)

*Primary Examiner* — Jacob T Minskey
*Assistant Examiner* — Matthew Hoover
(74) *Attorney, Agent, or Firm* — Payal A. Patel

(57) ABSTRACT

Embodiments of a curved vehicle display including a display module having a display surface, a curved glass substrate disposed on the display surface having a first major surface, a second major surface having a second surface area, and a thickness in a range from 0.05 mm to 2 mm, wherein the second major surface comprises a first radius of curvature of 200 mm or greater, wherein, when the display module emits a light, the light transmitted through the glass substrate has a substantially uniform color along 75% or more of the second surface area, when viewed at a viewing angle at a distance of 0.5 meters from the second surface. Methods of forming a curved vehicle display are also disclosed.

20 Claims, 14 Drawing Sheets

(51) Int. Cl.

| | | |
|---|---|---|
| *B32B 7/00* | (2019.01) | |
| *B32B 17/00* | (2006.01) | |
| *B32B 37/00* | (2006.01) | |
| *B32B 38/00* | (2006.01) | |
| *C03B 23/00* | (2006.01) | |
| *C03C 27/00* | (2006.01) | |
| *G02F 1/00* | (2006.01) | |
| *H05K 5/00* | (2006.01) | |
| *B32B 37/12* | (2006.01) | |
| *B32B 7/12* | (2006.01) | |
| *B32B 17/06* | (2006.01) | |
| *C03C 27/10* | (2006.01) | |
| *G02F 1/13* | (2006.01) | |
| *G02F 1/1333* | (2006.01) | |
| *C03B 23/03* | (2006.01) | |
| *C03B 23/035* | (2006.01) | |
| *B32B 38/18* | (2006.01) | |

(52) U.S. Cl.
CPC .......... *B32B 37/12* (2013.01); *B32B 38/0012* (2013.01); *B32B 38/1866* (2013.01); *C03B 23/0302* (2013.01); *C03B 23/0357* (2013.01); *C03C 27/10* (2013.01); *G02F 1/1303* (2013.01); *G02F 1/133308* (2013.01); *H05K 5/0017* (2013.01); *B32B 2457/20* (2013.01); *B32B 2457/202* (2013.01); *B32B 2605/003* (2013.01); *B60K 2370/20* (2019.05); *B65G 2249/02* (2013.01); *G02F 1/133331* (2021.01)

(58) Field of Classification Search
CPC ......... B32B 17/06; B32B 37/00; B32B 37/10; B32B 37/12; B32B 38/00; B32B 38/001; B32B 38/0012; B32B 38/10; B32B 38/18; B32B 38/186; B32B 38/1866; C03B 23/00; C03B 23/03; C03B 23/03; C03B 23/035; C03B 23/0357; C03B 27/00; C03B 27/10; C03B 23/0302; G02F 1/00; G02F 1/10; G02F 1/13; G02F 1/13; G02F 1/1303; G02F 1/133; G02F 1/1333; G02F 1/1333; G02F 1/133308; H05K 5/00; H05K 5/001; H05K 5/0017
See application file for complete search history.

(56) References Cited

U.S. PATENT DOCUMENTS

| | | | |
|---|---|---|---|
| 4,985,099 | A | 1/1991 | Mertens et al. |
| 6,044,662 | A | 4/2000 | Morin |
| 6,086,983 | A | 7/2000 | Yoshizawa |
| 6,332,690 | B1 | 12/2001 | Murofushi |
| 6,582,799 | B1 | 6/2003 | Brown et al. |
| 7,375,782 | B2 | 5/2008 | Yamazaki et al. |
| 8,344,369 | B2 * | 1/2013 | Yamazaki ............ H01L 27/1214 257/40 |
| 8,549,885 | B2 | 10/2013 | Dannoux et al. |
| 8,833,106 | B2 | 9/2014 | Dannoux et al. |
| 8,912,447 | B2 | 12/2014 | Leong et al. |
| 9,061,934 | B2 | 6/2015 | Bisson et al. |
| 9,593,042 | B2 | 3/2017 | Hu et al. |
| 9,802,485 | B2 | 10/2017 | Masuda et al. |
| 9,895,975 | B2 | 2/2018 | Lee et al. |
| 9,902,640 | B2 | 2/2018 | Dannoux et al. |
| 9,931,817 | B2 | 4/2018 | Rickerl |
| 10,131,118 | B2 | 11/2018 | Kang et al. |
| 2007/0223121 | A1 | 9/2007 | Franck et al. |
| 2009/0179840 | A1 | 7/2009 | Tanaka et al. |
| 2009/0185127 | A1 | 7/2009 | Tanaka et al. |
| 2010/0031590 | A1 | 2/2010 | Buchwald et al. |
| 2012/0202030 | A1 | 8/2012 | Kondo et al. |
| 2013/0020007 | A1* | 1/2013 | Niiyama ........... B32B 17/10908 156/60 |
| 2013/0088441 | A1 | 4/2013 | Chung et al. |
| 2015/0246507 | A1 | 9/2015 | Brown et al. |
| 2016/0297176 | A1 | 10/2016 | Rickerl |
| 2016/0306451 | A1 | 10/2016 | Isoda et al. |
| 2016/0375808 | A1 | 12/2016 | Etienne et al. |
| 2017/0008377 | A1 | 1/2017 | Fisher et al. |
| 2017/0021661 | A1 | 1/2017 | Pelucchi |
| 2017/0327402 | A1 | 11/2017 | Fujii et al. |
| 2017/0349473 | A1 | 12/2017 | Moriya et al. |
| 2018/0050948 | A1 | 2/2018 | Faik et al. |
| 2018/0111569 | A1 | 4/2018 | Faik et al. |
| 2018/0147985 | A1 | 5/2018 | Brown et al. |
| 2018/0149777 | A1 | 5/2018 | Brown |
| 2018/0149907 | A1 | 5/2018 | Gahagan et al. |
| 2018/0188869 | A1 | 7/2018 | Boggs et al. |
| 2018/0210118 | A1 | 7/2018 | Gollier et al. |
| 2018/0245125 | A1 | 8/2018 | Tsai et al. |

FOREIGN PATENT DOCUMENTS

| | | |
|---|---|---|
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| DE | 4415787 A1 | 11/1995 |
| DE | 102004022008 A1 | 12/2004 |
| DE | 102013214108 A1 | 2/2015 |
| FR | 2918411 B1 | 1/2009 |
| GB | 2011316 A | 7/1979 |
| JP | 3059337 U | 6/1991 |
| JP | 2015092422 A | 5/2015 |
| JP | 2016031696 A | 3/2016 |
| JP | 05976561 B2 | 8/2016 |
| JP | 2016173794 A | 9/2016 |
| JP | 2016203609 A | 12/2016 |
| WO | 199801649 A1 | 1/1998 |
| WO | 2007108861 A1 | 9/2007 |
| WO | 2012058084 A2 | 5/2012 |
| WO | 2015031594 A2 | 3/2015 |
| WO | 2016044360 A1 | 3/2016 |
| WO | 2016196531 A1 | 12/2016 |
| WO | 2016196546 A1 | 12/2016 |
| WO | 2017155932 A1 | 9/2017 |
| WO | 2018005646 A1 | 1/2018 |
| WO | 2018009504 A1 | 1/2018 |
| WO | 2018075853 A2 | 4/2018 |
| WO | 2018081068 A1 | 5/2018 |
| WO | 2018125683 A1 | 7/2018 |

OTHER PUBLICATIONS

International Searching Authority Invitation to Pay Additional Fees PCT/US2018/050881 dated Dec. 3, 2018, 22 Pgs.

* cited by examiner

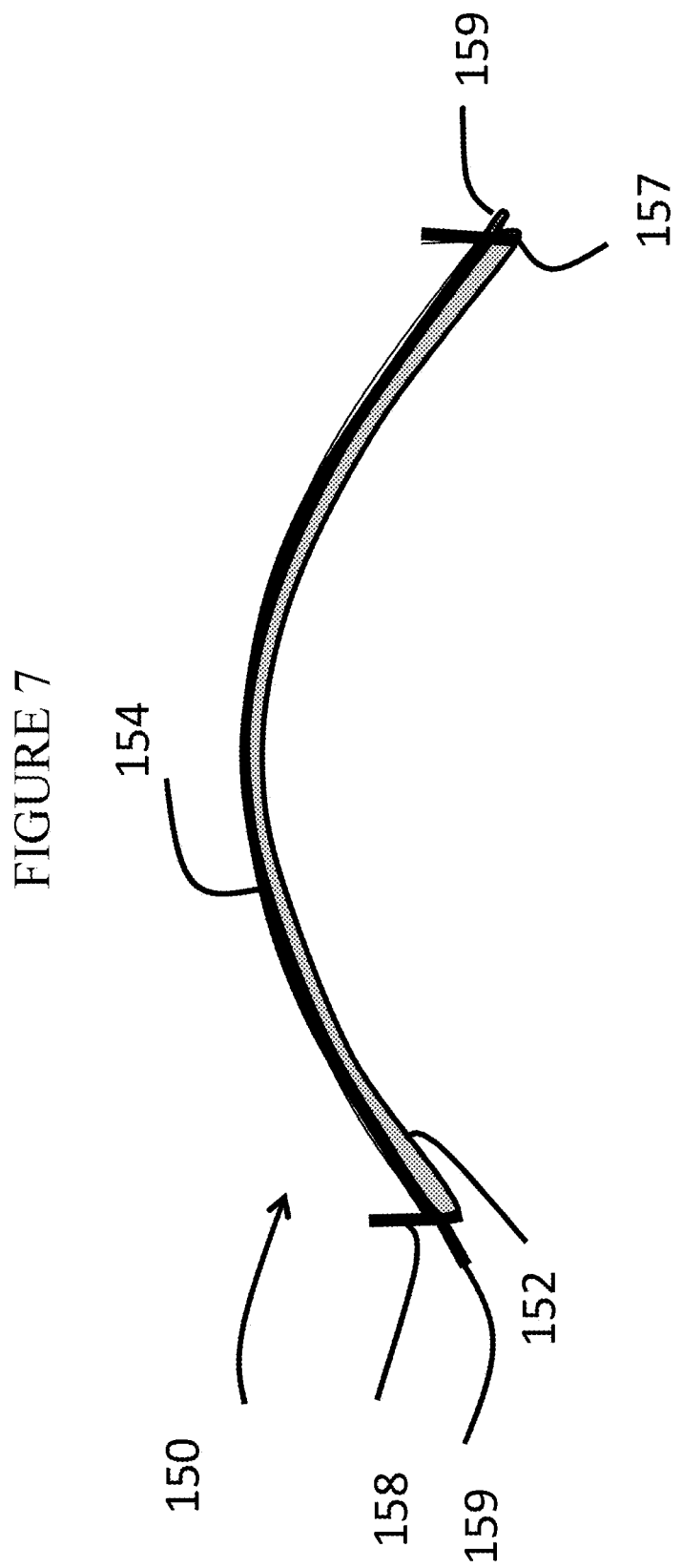

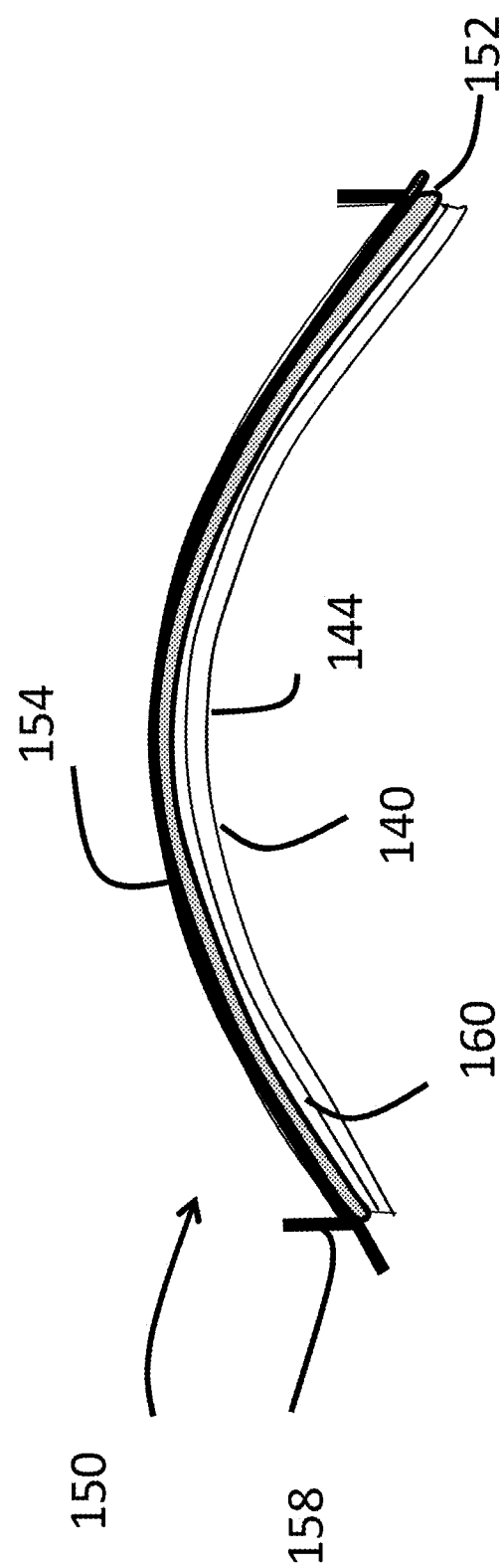

CURVED VEHICLE DISPLAYS

CROSS-REFERENCE TO RELATED APPLICATIONS

This application claims the benefit of priority under 35 U.S.C. § 119 of U.S. Provisional Application Ser. No. 62/558,337 filed on Sep. 13, 2017, the content of which is relied upon and incorporated herein by reference in its entirety.

BACKGROUND

The disclosure relates to curved vehicle displays and methods for forming the same, and more particularly to vehicle interior systems including a curved display with a curved cover glass and methods for forming the same.

Vehicle interiors include curved surfaces and can incorporate displays (with and without touch functionality) in such curved surfaces. The materials used to form such curved surfaces are typically limited to polymers, which do not exhibit the durability and optical performance of glass. As such, curved glass substrates are desirable, especially when used as covers for displays and/or touch panel. Existing methods of forming such curved glass substrates, such as thermal forming, have drawbacks including high cost, optical distortion, and surface marking. Accordingly, there is a need for curved vehicle displays that can incorporate a curved glass substrate in a cost-effective manner and without problems typically associated with glass thermal forming processes. Moreover, there is a need for such curved vehicle displays to exhibit superior display optical properties.

SUMMARY

A first aspect of this disclosure pertains to a curved vehicle displays. In one or more embodiments, the curved vehicle display comprises a display module having a display surface, a curved glass substrate disposed on the display surface, the glass substrate comprising a first major surface, a second major surface having a second surface area, a minor surface connecting the first major surface and the second major surface, and a thickness in a range from 0.05 mm to 2 mm, wherein the second major surface comprises a first radius of curvature of 200 mm or greater, wherein, when the display module emits a light, the light transmitted through the glass substrate has a substantially uniform color along 75% or more of the second surface area, when viewed at a viewing angle at a distance of 0.5 meters from the second surface.

A second aspect of this disclosure pertains to a method of forming a curved vehicle display comprising providing a substrate having a first major surface and a second major surface opposite the first major surface; positioning the substrate on a support surface, the first major surface facing the support surface; conforming the first major surface of the substrate to the support surface; and attaching a rear panel on the second major surface of the substrate while the first major surface is in conforming contact with the support surface, the attaching comprising curing a first adhesive between the rear panel and the second major surface while an ambient environment of the first adhesive is subjected to a first vacuum, wherein the support surface comprises a first radius of curvature.

A third aspect of this disclosure pertains to a vehicle interior component laminating system comprising: a chamber configured to receive components of a vehicle interior system, a first pressure of an interior of the chamber being controllable; a curved support surface disposed in a lower part of the chamber; and an upper stage disposed in an upper part of the chamber, the upper stage being configured to hold components of the vehicle interior system, wherein the upper stage and the curved support surface are movable relative to one another such that the upper stage can position the components of the vehicle interior system on the curved support surface for cold-forming the vehicle interior system.

A fourth aspect of this disclosure pertains to a method of forming a curved vehicle display comprising: positioning a glass substrate on a support surface, the glass substrate having a first major surface and a second major surface opposite the first major surface, the first major surface facing the support surface, the support surface being flexible and able to have a three-dimensional or curved surface shape; attaching a back panel to the glass substrate via an adhesive on the second major surface of the glass substrate, wherein the glass substrate, the adhesive, and the back panel form a laminate structure; bending the laminate structure using a plurality of piezoelectric bending actuators on a back panel side of the laminate structure, wherein the bending of the laminate structure occurs below a glass transition temperature of the glass substrate, wherein the laminate structure having a first radius of curvature after bending, and the support surface assumes a curved surface shape to conform to the first radius of curvature of the laminate structure.

A fifth aspect of this disclosure pertains to a method of forming a curved vehicle display comprising: providing a glass substrate having a first major surface and a second major surface opposite the first major surface; positioning the glass substrate on a deformable surface of a platform with the first major surface facing the deformable surface; providing an adhesive to the second major surface of the glass substrate; attaching a display panel to the glass substrate via the adhesive on the second major surface, forming a laminate structure comprising the glass substrate, the adhesive, and the display panel; cold bending the laminate structure by applying a curved surface of a die to a display-unit-side of the laminate structure, forming a curved laminate structure, the curved surface of the die comprising a first radius of curvature, wherein the deformable surface of the platform deforms to accommodate the cold bending of the laminate structure; and applying a pre-curved backlight unit and a pre-curved frame to the display panel of the curved laminate structure.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 7 is a side view illustration of an alternative embodiment of a curved vehicle display;

FIG. 8 is a side view illustration of an alternative embodiment of a curved vehicle display;

DETAILED DESCRIPTION

Reference will now be made in detail to various embodiments, examples of which are illustrated in the accompanying drawings. In general, vehicle displays may include a curved surface designed to follow the contours of the surrounding vehicle interior (e.g., the dashboard or center console). The present disclosure provides articles and methods for forming these curved vehicle displays using a glass material. Forming curved vehicle displays from a glass material may provide a number of advantages compared to the typical curved plastic panels that are conventionally found in vehicle displays. For example, glass is typically considered to provide enhanced functionality and user experience for many curved cover material applications, such as display applications and touch screen applications, compared to plastic cover materials.

The embodiments described herein incorporate a curved glass substrate that may be curved using a hot forming process or a cold-forming process. Applicant has found that the systems and methods discussed herein specifically provide curved vehicle displays in an economical and efficient process. The resulting curved vehicle displays also exhibit superior optical performance in terms of color uniformity.

A first aspect of the instant application pertains to a curved vehicle display system that can be used in various vehicle interiors. The various embodiments of the curved vehicle displays may be incorporated into vehicles such as trains, automobiles (e.g., cars, trucks, buses and the like), seacraft (boats, ships, submarines, and the like), and aircraft (e.g., drones, airplanes, jets, helicopters and the like).

Figure 1:
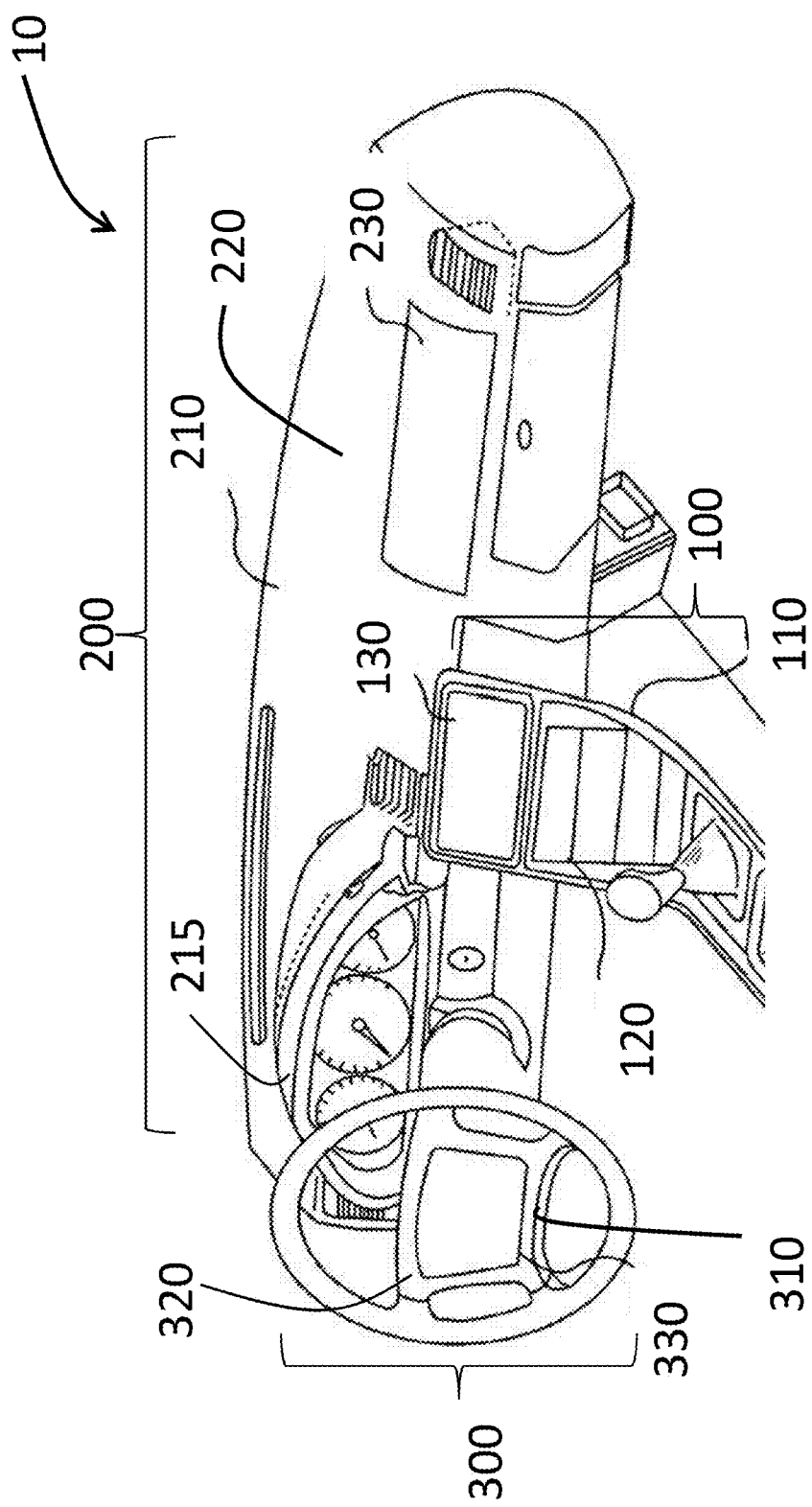
FIG. 1 is a perspective view illustration of a vehicle interior with vehicle interior systems according to one or more embodiments.

FIG. 1 illustrates an exemplary vehicle interior 10 that includes three different embodiments of a vehicle interior system 100, 200, 300. Vehicle interior system 100 includes a center console base 110 with a curved surface 120 including a curved vehicle display 130. Vehicle interior system 200 includes a dashboard base 210 with a curved surface 220 including a curved vehicle display 230. The dashboard base 210 typically includes an instrument panel 215 which may also include a curved vehicle display. Vehicle interior system 300 includes a steering wheel base 310 with a curved surface 300 and a curved vehicle display 330. In one or more embodiments, the vehicle interior system may include a base that is an arm rest, a pillar, a seat back, a floor board, a headrest, a door panel, or any portion of the interior of a vehicle that includes a curved surface.

The embodiments of the curved vehicle display described herein can be used interchangeably in each of vehicle interior systems 100, 200 and 300. Further, the curved glass articles discussed herein may be used as curved cover glasses for any of the curved vehicle display embodiments discussed herein, including for use in vehicle interior systems 100, 200 and/or 300.

Figure 2:
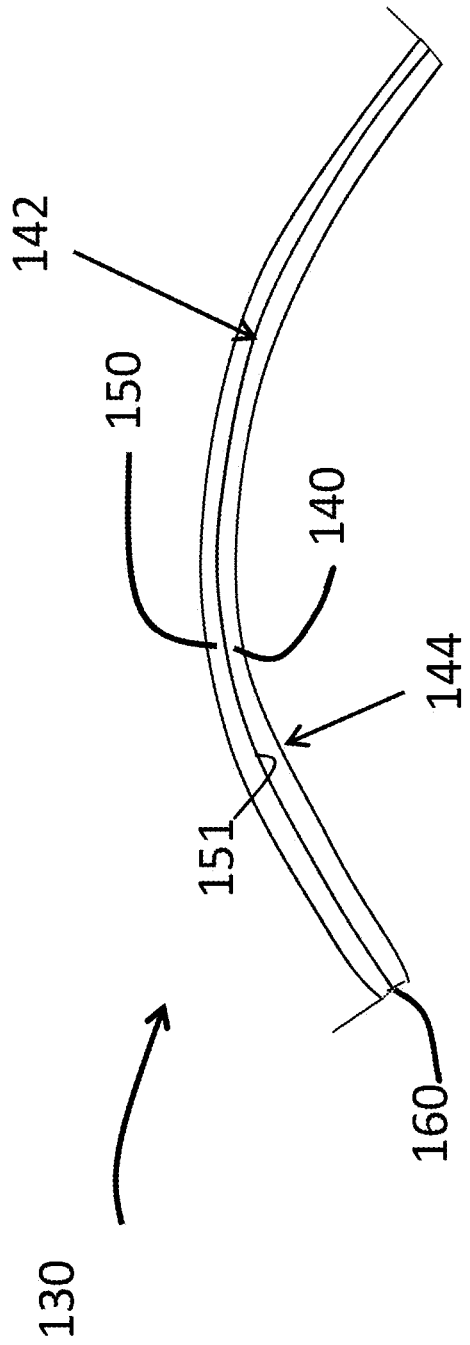
FIG. 2 is a side view illustration of a curved vehicle display including a glass substrate and a display module, according to one or more embodiments.

As shown in FIG. 2, in one or more embodiments the curved vehicle display 130 includes a curved glass substrate 140 having a first radius of curvature and a display module 150 having a display surface 151 on which the glass substrate is disposed, wherein, when the display module emits a light, the light transmitted through the glass substrate has a substantially uniform color.

Figure 3:
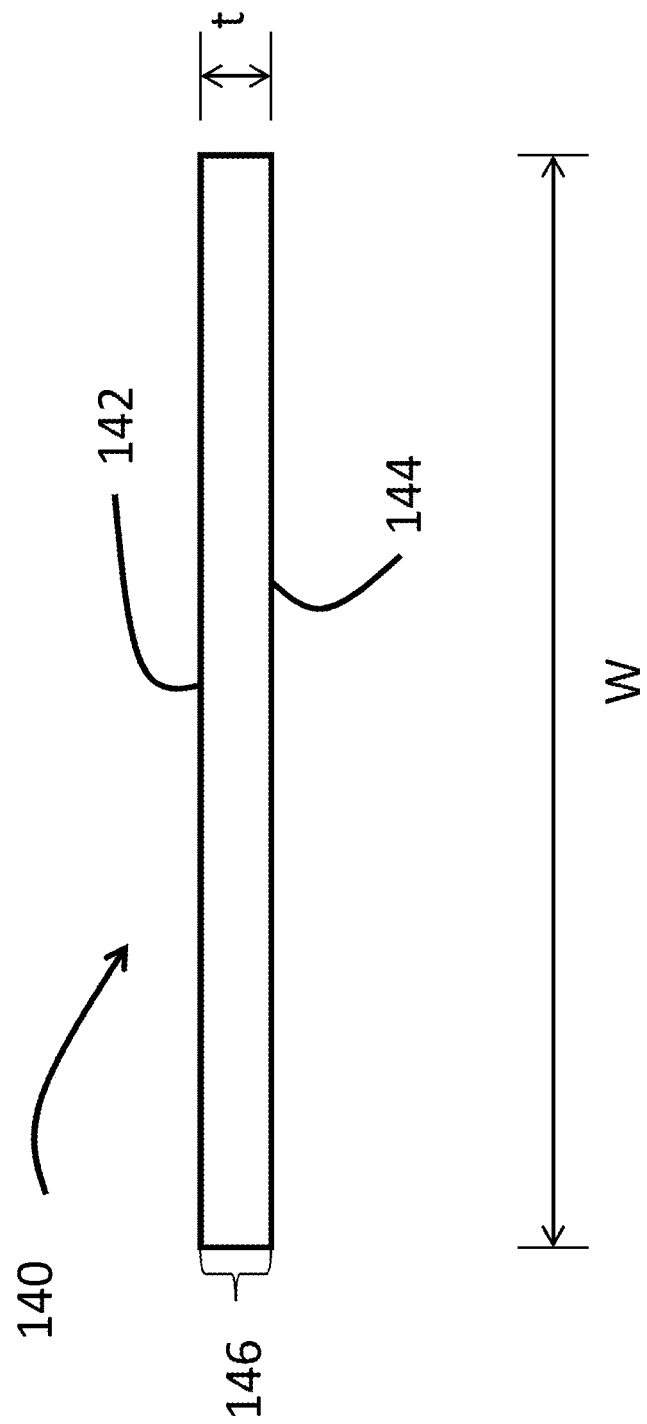
FIG. 3 is a side view illustration of the glass substrate used in the curved vehicle display of FIG. 2.
Figure 4:
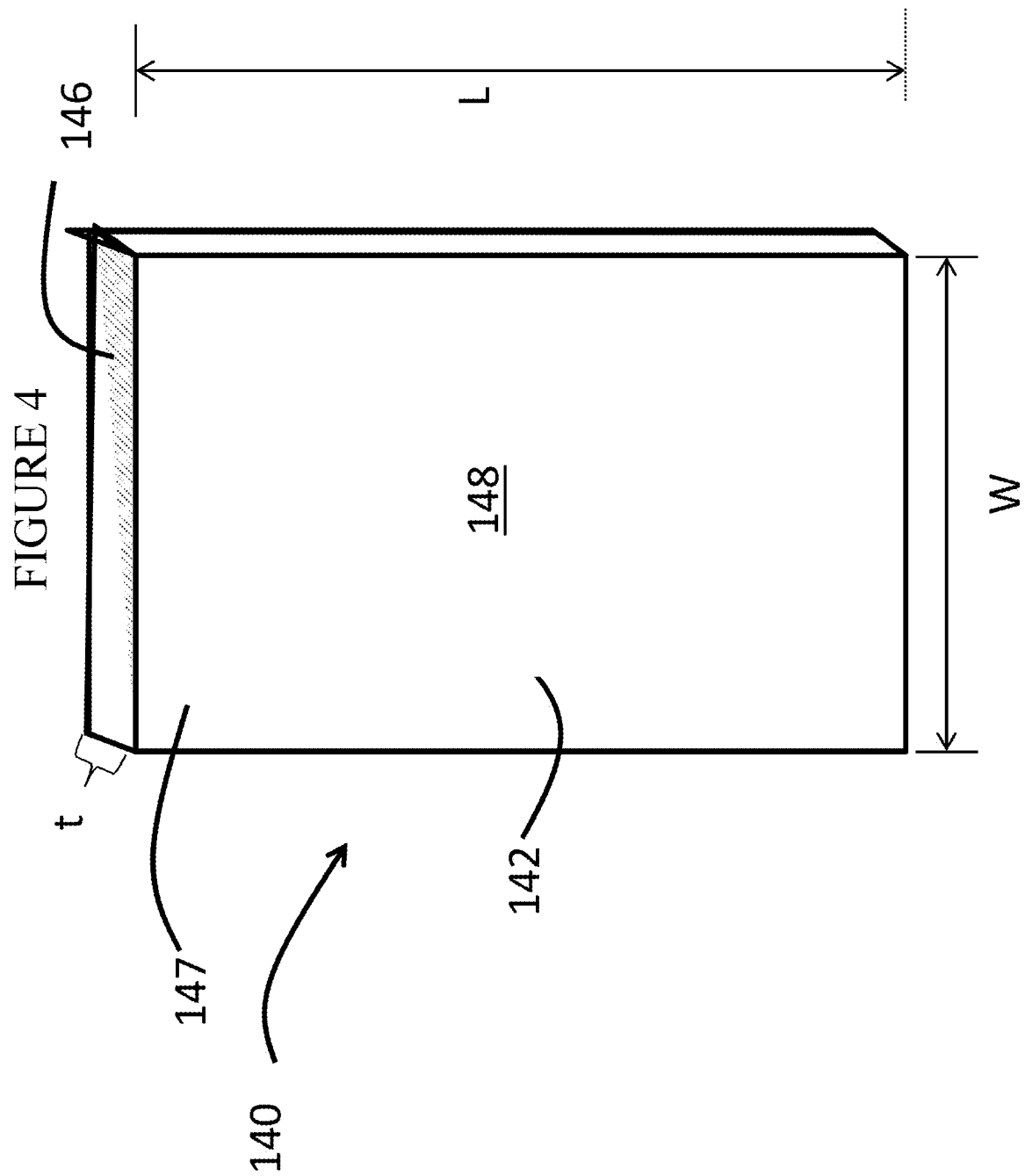
FIG. 4 is a front perspective view illustration of the glass substrate of FIG. 3.

Referring to FIGS. 3 and 4, the glass substrate 140 includes a first major surface 142 and a second major surface 144 opposite the first major surface. The glass substrate exhibits the first radius of curvature as measured on the second major surface 144.

In one or more embodiments, the curved glass substrate is hot-formed. In such embodiments, the hot-formed curved glass substrate is permanently curved without being supported by another material. In some embodiments, hot-formed curved glass substrates exhibit substantially the same stress on the first major surface 142 and the second major surface 144. In other words, one major surface does not experience or exhibit greater compressive stress than the opposite major surface due to the curvature.

In one or more embodiments, the curved glass substrate is cold-formed. As used herein, the terms "cold-bent," "cold-bending," "cold-formed" or "cold-forming" refers to curving the glass substrate at a cold-form temperature which is less than the strain point of the glass or less than the softening point of the glass (as described herein). An attribute of a cold-formed glass substrate is asymmetric surface compressive between the first major surface 142 and the second major surface 144. A minor surface 146 connects the first major surface 142 and the second major surface 144. In one or more embodiments, prior to the cold-forming process or being cold-formed, the respective compressive stresses in the first major surface 142 and the second major surface 144 of the glass substrate are substantially equal. In one or more embodiments in which the glass substrate is unstrengthened, the first major surface 142 and the second major surface 144 exhibit no appreciable compressive stress, prior to cold-forming. In one or more embodiments in which the glass substrate is strengthened (as described herein), the first major surface 142 and the second major surface 144 exhibit substantially equal compressive stress with respect to one another, prior to cold-forming. In one or more embodiments, after cold-forming (shown, for example, in FIGS. 2 and 7, the compressive stress on the surface having a concave shape after bending (e.g., second major surface 144 in FIGS. 2 and 7) increases. In other words, the compressive stress on the concave surface (e.g., second major surface 144) is greater after cold-forming than before cold-forming. Without being bound by theory, the cold-forming process increases the compressive stress of the glass substrate being shaped to compensate for tensile stresses imparted during bending and/or forming operations. In one or more embodiments, the cold-forming process causes the concave surface (second major surface 144) to experience compressive stresses, while the surface forming a convex shape (i.e., the first major surface 142 in FIGS. 2 and 7) after cold-forming experiences tensile stresses. The tensile stress experienced by the convex (i.e., the first major surface 142) following cold-forming results in a net decrease in surface compressive stress, such that the compressive stress in convex surface (i.e., the first major surface 142) of a strengthened glass sheet following cold-forming is less than the compressive stress on the same surface (i.e., first major surface 142) when the glass sheet is flat.

When a strengthened glass substrate is utilized, the first major surface and the second major surface (142, 144) are already under compressive stress, and thus the first major surface can experience greater tensile stress during bending without risking fracture. This allows for the strengthened glass substrate to conform to more tightly curved surfaces.

In one or more embodiments, the thickness of the glass substrate is tailored to allow the glass substrate to be more flexible to achieve the desired radius of curvature from cold-forming. Moreover, a thinner glass substrate 140 may deform more readily, which could potentially compensate for shape mismatches and gaps that may be created by the shape of the display module 150. In one or more embodiments, a thin and strengthened glass substrate 140 exhibits greater flexibility especially during cold-forming. The greater flexibility of the glass substrates discussed herein may both allow for sufficient degrees of bending to be created via the air pressure-based bending processes as discussed herein and also for consistent bend formation without heating. In one or more embodiments, the glass substrate 140 and at least a portion of the display module 150 have substantially similar radii of curvature to provide a substantially uniform distance between the first major surface 142 and the display module 150 (which may be filled with an adhesive).

In one or more embodiments, the curved glass substrate, the display or both the curved glass substrate and the display may have a compound curve including a major radius and a cross curvature. A complexly curved glass substrate, display or both the glass substrate and display may have a distinct radius of curvature in two independent directions. According to one or more embodiments, the complexly curved cold-formed glass substrate, display, or both the glass substrate and the display may thus be characterized as having "cross curvature," where the such glass substrate and/or display are curved along an axis (i.e., a first axis) that is parallel to a given dimension and also curved along an axis (i.e., a second axis) that is perpendicular to the same dimension. The curvature of the glass substrate and/or display can be even more complex when a significant minimum radius is combined with a significant cross curvature, and/or depth of bend.

In the embodiment shown, the glass substrate has a thickness (t) that is substantially constant and is defined as a distance between the first major surface 142 and the second major surface 144. The thickness (t) as used herein refers to the maximum thickness of the glass substrate. In the embodiment shown in FIGS. 3-4, the glass substrate includes a width (W) defined as a first maximum dimension of one of the first or second major surfaces orthogonal to the thickness (t), and a length (L) defined as a second maximum dimension of one of the first or second surfaces orthogonal to both the thickness and the width. In other embodiments, the dimensions discussed herein may be average dimensions.

In one or more embodiments, the glass substrate has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the glass substrate has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate may be strengthened. In one or more embodiments, the glass substrate may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass substrate may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In one or more embodiments, the glass substrate may be chemically strengthening by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate maybe strengthened to exhibit a DOC that is described a fraction of the thickness t of the glass substrate (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Suitable glass compositions for use in the glass substrate include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Figure 5:
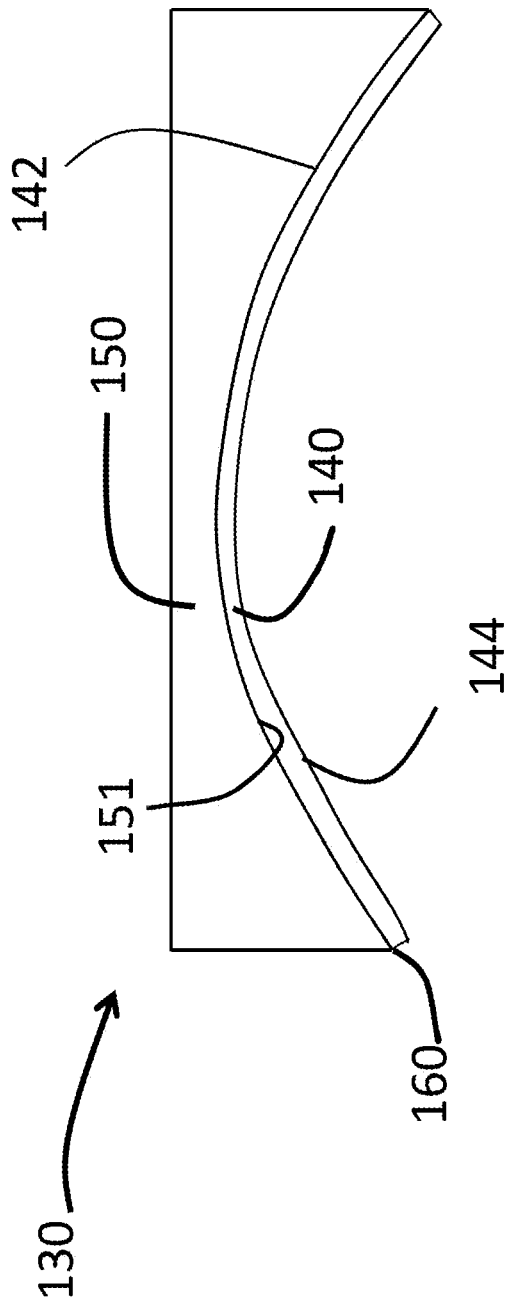
FIG. 5 is side view of a curved vehicle display of one or more embodiments.

In one or more embodiments, the curved glass substrate 140 has a curvature (first radius of curvature). In some embodiments, the display surface 151 is flat and only the glass substrate 140 is curved. In one or more embodiments, both the glass substrate 140 and the display surface 151 are curved, as shown n FIG. 5. In one or more embodiments, the glass substrate 140, the display surface 151 and the display 150 are curved, as shown in FIG. 2. In one or more embodiments, the first radius of curvature matches the curvature (second radius of curvature) of at least a portion of the display surface 151. In one or more embodiments, at least a portion of the display surface 151 is curved to approach or match the curvature of the curved glass substrate 140. In one or more embodiments, the display module 150 includes a second glass substrate, a backlight unit and other components, any of which may be flexible or may permanently exhibit a curvature. In some embodiments, the entire display module is curved to a second radius of curvature (as shown in FIG. 2). In one or more embodiments, the glass substrate 140 is curved to a curvature that approaches or matches the curvature of at least a portion of the display surface 151. In one or more embodiments, at least a portion of the display module 150 is cold-formed to a curvature that approaches or matches the first radius of curvature of the glass substrate 140.

As used herein, when the first radius of curvature of the glass substrate varies across its area, the radius of curvature referred to herein is the minimum first radius of curvature of the glass substrate. Similarly, when the second radius of curvature of the display module varies across its area, the second radius of curvature referred to herein is the minimum radius of curvature of the display module.

In one or more embodiments, the glass substrate 140 has a first radius of curvature of about 60 mm or greater. For example, the first radius of curvature may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, one or both the display surface 151 and the display module 150 has a second radius of curvature of about 60 mm or greater. For example, the second radius of curvature may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, the glass substrate is curved to exhibit a first radius curvature that is within 10% (e.g., about 10% or less, about 9% or less, about 8% or less, about 7% or less, about 6% or less, or about 5% or less) of the second radius of curvature of the display surface 151 or the display module 150. For example, if the display surface 151 or the display module 150 exhibits a radius of curvature of 1000 mmm, the glass substrate is curved to have a radius of curvature in a range from about 900 mm to about 1100 mm.

Figure 6:
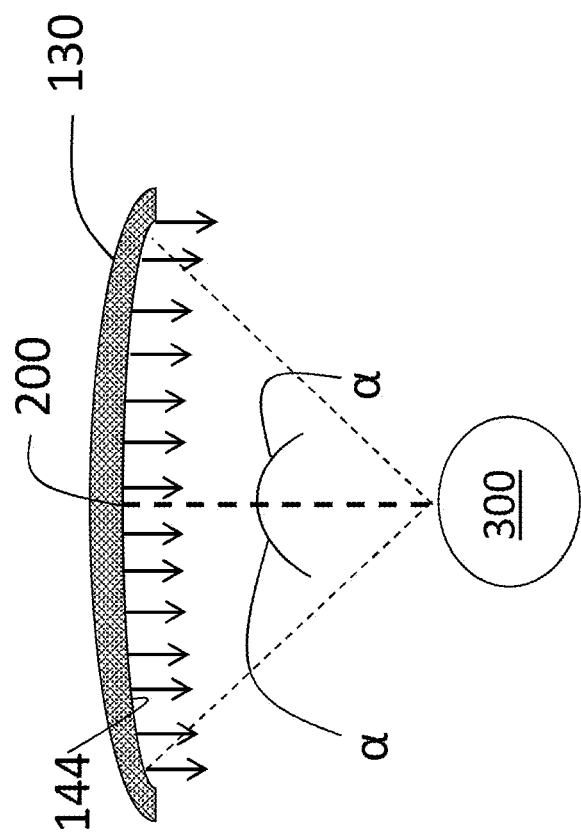
FIG. 6 is top plan view of a curved vehicle display of one or more embodiments.

In one or more embodiments, the curved vehicle display 130 exhibits substantially uniform color. As shown in FIG. 6, in one or more embodiments, when the display module emits a light, the light transmitted through the glass substrate (as observed or measured from a viewer 300) has a substantially uniform color. As used herein, substantially uniform color means the light exhibits a color having a Delta E* that is about 10 or less, about 9 or less, about 8 or less, about 7 or less about 6 or less, about 5 or less, about 4 or less, or about 3 or less, as measured using the CIE L*a*b* color space, and equation (1).

Equation (1): Delta $(\Delta)E^* = [(L_1^* - L_2^*)^2 + (b_1^* - b_2^*)^2 + (b_1^* - b_2^*)^2]^{1/2}$, wherein $L_1^*$, $a_1^*$ and $b_1^*$ are the maximum color coordinates measured in a one square centimeter area of the first surface, and $L_2^*$, $a_2^*$ and $b_2^*$ are the maximum color coordinates measured in another one square centimeter area of the second surface area. In one or more embodiments, substantially uniform color may be exhibited along 75% or more, 80% or more, 85% or more, 90% or more, 95% or more, 99% or more, or the entire surface area of the second major surface 144 (the second surface area). In one or more embodiments, the uniform color is present at various viewing angles α. For example, the uniform color is present when the viewing angle is normal with respect to a center point 200. In one or more embodiments, the uniform color is exhibited by the curved vehicle display 130 when viewed at a viewing angle (with respect to the center point 200) that is in a range from normal to 60 degrees away from normal, from normal to 55 degrees away from normal, from normal to 50 degrees away from normal, from normal to 45 degrees away from normal, from normal to 40 degrees away from normal, from normal to 35 degrees away from normal, from normal to 30 degrees away from normal, from normal to 25 degrees away from normal, from normal to 20 degrees away from normal, from normal to 15 degrees away from normal, or from normal to 10 degrees away from normal.

In one or more embodiments, the light is emitted from a light source in the display module. For example, the light source may be any one of light-emitting diodes (LEDs), an electroluminescent panel (ELP), cold cathode fluorescent lamps (CCFLs), hot cathode fluorescent lamps (HCFLs), and external electrode fluorescent lamps (EEFLs). In one or more embodiments, the display is an OLED display and the light is emitted from such display.

In one or more embodiments, the display module may have touch functionality that is accessible through the glass substrate. In one or more specific embodiments, the display module may include a touch panel. In one or more embodiments, the display module 150 includes a second glass substrate 152 and a backlight unit 154. As shown in FIG. 7 and FIG. 8, the second glass substrate is disposed adjacent the first major surface 142 of the glass substrate. Accordingly, the second glass substrate 152 is disposed between the backlight unit 154 and the first major surface 142. In one or more embodiments, the first major surface 142 is in direct contact with the second glass substrate 152. In one or more embodiments, the first major surface 142 is not in direct contact with the second glass substrate such that an air gap exists between the first major surface and the second glass substrate. In the embodiment shown, the backlight unit 154 is optionally curved to exhibit the second radius of curvature of the curved display 150. In one or more embodiments, the backlight unit 154 may be flexible to curve to the second radius of curvature. In one or more embodiments, the second glass substrate 152 may be curved to the second radius of curvature. In one or more specific embodiments, the second glass substrate may be cold-formed to exhibit the second radius of curvature. In such embodiments, the second radius of curvature is measured on the surface of the second glass substrate 152 adjacent the glass substrate 140. In one or more embodiments, the display module 150 (including any one or more of the backlight unit, the second glass substrate, and the frame) are permanently curved to the second radius of curvature of the curved display 150. In one or more embodiments, the second glass substrate may be cold-formed before or during lamination.

Figure 8A:
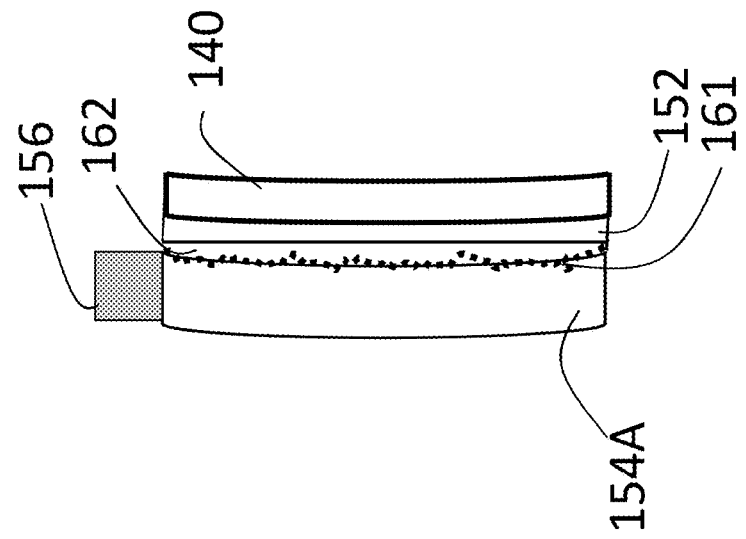
FIG. 8A is a side view illustration of an alternative embodiment of a curved vehicle display including a light guide plate.

In one or more embodiments, the second glass substrate is in direct contact with the first major surface 142 of the glass substrate. In such embodiments, a curved light guiding plate 154A is attached to the second glass substrate 152 instead of a backlight unit, as shown in FIG. 8A. An edge light source 156 is coupled to the light guide plate 154. The second glass substrate is cold-formed to the curved light guide plate. The glass substrate may also be cold-formed to the curved light guide plate. In one or more embodiments, an optically clear adhesive 160 is applied between the light guide plate and the second glass substrate. In one or more embodiments, the optically clear adhesive includes two layers having a different refractive index from one another. A first optically clear adhesive layer 161 has a relatively greater refractive index and a light scattering textured structure that creates a prism layer along the curved light guide plate. Without being bound by theory, this first optically clear adhesive layer directs the light from the light guide plate into a second optically clear adhesive layer 162 having a relatively lower refractive index (compared to the refractive index of the first optically clear adhesive layer). The second optically clear adhesive layer is in contact with the second glass substrate, while the first optically clear adhesive layer is in contact with the light guide plate. Without being bound by theory, the light guide plate provides rigidity to help maintain a curved shape, when a thinner second glass substrate is utilized.

In one or more embodiments, the second glass substrate may have a thickness greater than the thickness of the glass substrate. In one or more embodiments, the thickness is greater than 1 mm, or about 1.5 mm or greater. In one or more embodiments, the thickness of the second glass substrate may have a thickness that is substantially the same as the glass substrate. In one or more embodiments, the second glass substrate has a thickness in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

The second glass substrate may have the same glass composition as the glass substrate 140 or may differ from the glass composition used for the glass substrate 140. In one or more embodiments, the second glass substrate may have an alkali-free glass composition. Suitable glass compositions for use in the second glass substrate may include soda lime glass, alkali-free aluminosilicate glass, alkali-free borosilicate glass, alkali-free boroaluminosilicate glass, alkali-containing aluminosilicate glass, alkali-containing borosilicate glass, and alkali-containing boroaluminosilicate glass. In one or more embodiments, the second glass substrate may be strengthened (as disclosed herein with respect to the glass substrate 140). In some embodiments, the second glass substrate is unstrengthened or strengthened only by mechanical and/or thermal strengthening (i e., not strengthened by chemical strengthening). In some embodiments, the second glass substrate may be annealed.

In one or more embodiments, the curved display includes an adhesive or adhesive layer 160 between the glass substrate 140 and the display module 150. The adhesive may be optically clear. In some embodiments, the adhesive is disposed on a portion of the glass substrate 140 and/or the display module 150. For example, as shown in FIG. 4, the glass substrate may include a periphery 147 adjacent the minor surface 146 defining an interior portion 148, and the adhesive may be disposed on at least a portion of the periphery. The thickness of the adhesive may be tailored to ensure lamination between the display module 150 (and more particularly the second glass substrate) and the glass substrate 140. For example, the adhesive may have a thickness of about 1 mm or less. In some embodiments, the adhesive has a thickness in a range from about 200 µm to about 500 µm, from about 225 µm to about 500 µm, from about 250 µm to about 500 µm, from about 275 µm to about 500 µm, from about 300 µm to about 500 µm, from about 325 µm to about 500 µm, from about 350 µm to about 500 µm, from about 375 µm to about 500 µm, from about 400 µm to about 500 µm, from about 200 µm to about 475 µm, from about 200 µm to about 450 µm, from about 200 µm to about 425 µm, from about 200 µm to about 400 µm, from about 200 µm to about 375 µm, from about 200 µm to about 350 µm, from about 200 µm to about 325 µm, from about 200 µm to about 300 µm, or from about 225 µm to about 275 µm.

In one or more embodiments, the either one of or both the first major surface 142 and the second major surface 144 of the glass substrate includes a surface treatment. The surface treatment may cover at least a portion of the first major surface 142 and the second major surface 144. Exemplary surface treatments include an easy-to-clean surface, an anti-glare surface, an anti-reflective surface, and a pigment design. In one or more embodiments, the surface treatment may include a tactile surface (i.e., a raised textured surface). In one or more embodiments, the tactile surface may be used in conjunction with a haptic feedback system (including a vibration motor). In one or more embodiments, the at least a portion of the first major surface and 142/or the second major surface 144 may include any one, any two or all three of an anti-glare surface, an anti-reflective surface, and a pigment design. For example, first major surface 142 may include an anti-glare surface and the second major surface 144 may include an anti-reflective surface. In another example, the first major surface 142 includes an anti-reflective surface and the second major surface 144 includes an anti-glare surface. In yet another example, the first major surface 142 comprises either one of or both the anti-glare surface and the anti-reflective surface, and the second major surface 144 includes the pigment design.

The pigment design may include any aesthetic design formed from a pigment (e.g., ink, paint and the like) and can include a wood-grain design, a brushed metal design, a graphic design, a portrait, or a logo. The pigment design may be printed onto the glass substrate. In one or more embodiments, the anti-glare surface includes an etched surface. In one or more embodiments, the anti-reflective surface includes a multi-layer coating. In one or more embodiments, the easy-to-clean surface includes an oleophobic coating that imparts anti-fingerprint properties.

In one or more embodiments, the surface treatment (i.e., the easy-to-clean surface, the anti-glare surface, the anti-reflective surface and/or the pigment design) is disposed on at least a portion of the periphery 147 and the interior portion 148 is substantially free of the surface treatment.

A second aspect of this disclosure pertains to a vehicle interior component laminating system. The vehicle interior components may include the various embodiments of the glass substrate and the display module as described. In one or more embodiments, the laminating system may be described as including a device for holding a temporarily (or non-permanently) curved glass substrate in the vacuum laminator. The device may include a vacuum chuck or electrostatic chuck performs an isolated function or process from the vacuum laminator, while still in the vacuum laminator. For example, where the device is a vacuum chuck, the vacuum applied to the glass substrate is varied based on the process step. Without being bound by theory, the laminating system according to one or more embodiments, the method for forming a curved vehicle display has the potential to be a low cost solution because it combines the curving the glass substrate and lamination or the glass substrate and display module in one process operation. Furthermore, since the lamination of the display module and the glass substrate can be performed under vacuum conditions, processes to remove air bubbles from any adhesive (e.g., autoclaving) may be eliminated. Moreover, the use of vacuum can enable application of uniform pressure across a significant portion or all of the surface area of the first surface of the glass substrate and provides inherent robustness to the process. The resultant process and curved vehicle display provides greater appeal, reliability, and design space.

Figure 9:
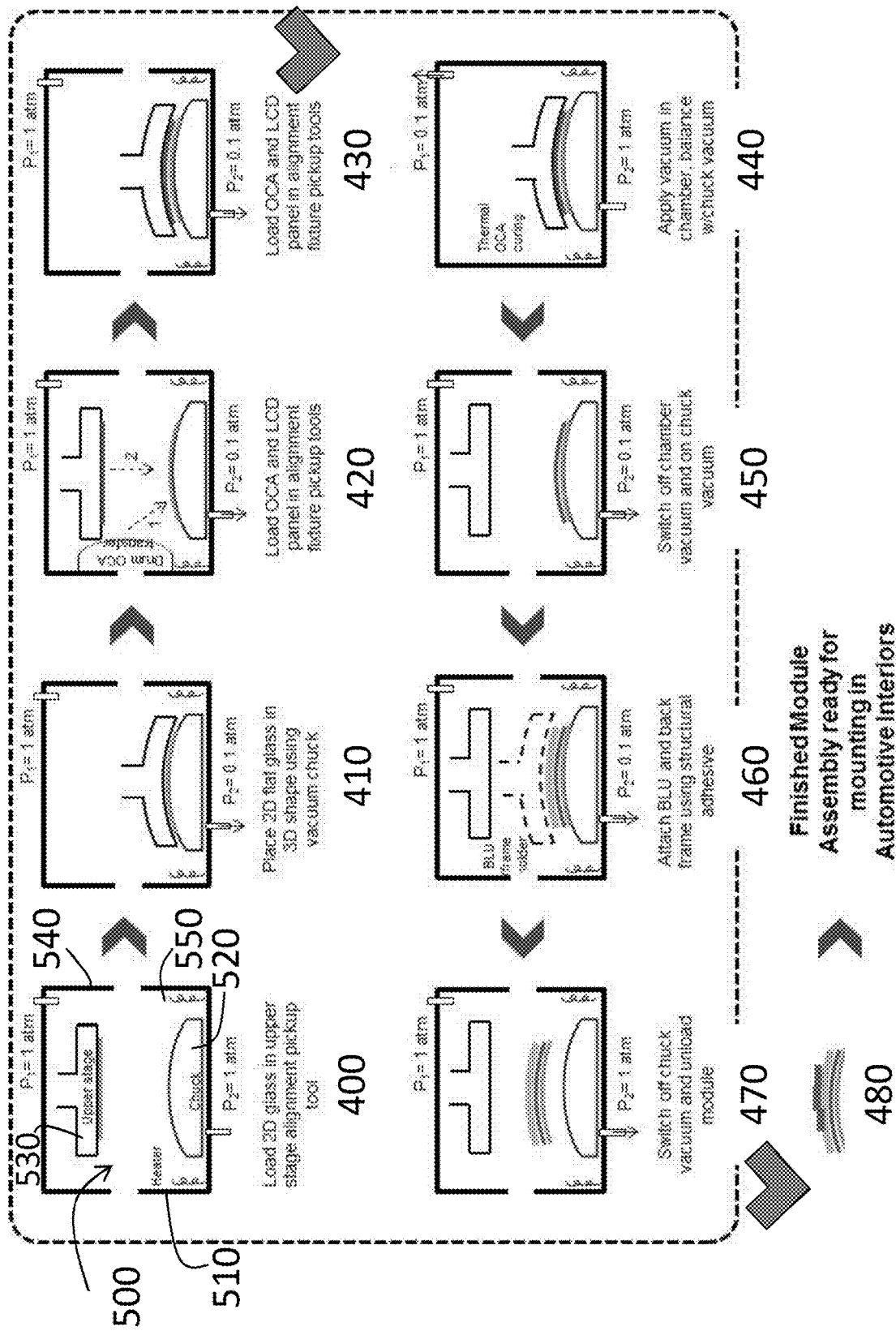
FIG. 9 illustrates a vehicle interior component laminating system and a method of forming a curved vehicle display, according to one or more embodiments.

Referring to FIG. 9, the vehicle interior component laminating system include a chamber 500 configured to receive components of a vehicle interior system, a curved support surface 520 disposed in a lower part 510 of the chamber, and an upper stage 530 disposed in an upper part of the chamber 540, the upper stage being configured to hold components of the vehicle interior system. In one or more embodiments the interior of the chamber has a first pressure that is controllable. In one or more embodiments, the upper stage 530 and the curved support surface 520 are movable relative to one another such that the upper stage can position the components of the vehicle interior system on the curved support surface for cold-forming the vehicle interior system.

In one or more embodiments, the curved support surface has a radius of curvature that is equal to a desired radius of curvature of the vehicle interior system. This radius of curvature may be equal to the first radius of curvature, otherwise described herein. In one or more embodiments, the curved support surface may include a vacuum chuck that exhibits or provides a second pressure that is separately controllable from the first pressure of the chamber. The vacuum chuck may be formed from plastic materials (e.g., PC/ABS, PVC, Delrin, etc.), metals (Al-alloys, Fe-alloys, etc.) or the like. In some embodiments, a coating may be applied onto the curved support surface to minimize scratches on substrate. Several processes such as casting, machining, stamping, injection molding, etc. could be utilized to make a vacuum chuck. In one or more embodiments, the curved support surface may include an electrostatic chuck exhibiting or providing an electrostatic force that is separately controllable from the first pressure of the chamber. In one or more embodiments, the vehicle interior component laminating system may include a heater 550 to thermally cure an adhesive of the vehicle interior system. In one or more embodiments, the upper stage 530 includes a flexible surface configured to conform to a curved shape of the components (e.g., the glass substrate or the display surface/display module) of the vehicle interior system when curved by the curved support surface.

A third aspect of this disclosure pertains to a method of forming a vehicle interior system. Referring to FIG. 9, the method includes providing a substantially planar (or 2D) substrate having a first major surface and a second major surface opposite the first major surface ay step 400, positioning the substrate on a support surface 520 such that the first major surface faces the support surface, and conforming the first major surface of the substrate to the support surface at step 410. In one or more embodiments, positioning the substrate on the support surface includes carrying and placing the substrate by a positioning device that is configured to align the substrate with the support surface. As shown in FIG. 9, the substrate is picked up by upper stage 530, and the substrate is aligned to the support surface 520 using laser/optical sensor or other positioning device. In one or more embodiments, the positioning device comprises a deformable engagement surface, and, when placing the substrate on the support surface, the deformable engagement surface temporarily deforms with the substrate as the substrate conforms to the support surface. As shown in FIG. 9, step 400 is conducted at ambient pressure (without vacuum). In one or more embodiments, the support surface comprises a first radius of curvature (as otherwise described herein). In one or more embodiments, the first radius of curvature is 100 mm or greater. In one or more embodiments, the conformed first major surface comprises a second radius of curvature that is within 10% of the first radius of curvature. In one or more embodiments, the support surface includes a third radius of curvature. In accordance with one or more embodiments, the first radius of curvature and the third radius of curvature are each radii about different axes of curvature. The conformed first major surface of the substrate may optionally include a fourth radius of curvature that is within 10% of the third radius of curvature.

In one or more embodiments, the support surface 520 comprises a holding mechanism configured to temporarily hold the substrate on the support surface, and the substrate is at least partially conformed to the support surface via the holding mechanism. In one or more embodiments, the holding mechanism is a vacuum chuck or an electrostatic chuck. In the embodiment shown, when the substrate is conformed to the substrate support, the holding mechanism applies a vacuum or force to the substrate (e.g., less than 1 atm, or about 0.1 atm).

In one or more embodiments, the method includes and attaching a display or touch panel on the second major surface of the substrate while the first major surface is in conforming contact with the support surface at steps 420, 430, and 440. During these steps, the vacuum or force is maintained on the substrate to confirm the substrate to the substrate support. In one or more embodiments, attaching comprises applying an adhesive between the display or touch panel and the second major surface, while an ambient environment of the first adhesive is subjected to a first vacuum at step 430. The adhesive may be applied utilizing drum or section drum die. In one or more embodiments, the first adhesive is an optically clear adhesive (OCA), though other adhesives described herein may be utilized. In one or more embodiments, attaching comprises curing a first adhesive between the display or touch panel and the second major surface while an ambient environment of the first adhesive is subjected to a first pressure of the first vacuum (i.e., the chamber is under the first pressure) at step 440. As described herein, the pressure or force of the holding mechanism (e.g., vacuum chuck or electrostatic chuck) is controllable independently of the first pressure of chamber. At step 440, when curing the first adhesive, a first pressure of the chamber is less than 1 atm, or about 0.1 atmospheres. In one or more embodiments, the method includes reducing the first pressure of the chamber from an initial pressure to a reduced pressure state while curing the first adhesive, and increasing the second pressure of the vacuum chuck to be greater than the first pressure while curing the first adhesive at step 440. In other words, the ambient pressure (or chamber vacuum) is reduced to 0.1 atmospheres in the reduced pressure state. In one or more embodiments, the method includes switching the pressure values of the first and second pressures during curing of the first adhesive. As shown in FIG. 9, after application of the adhesive at steps 420 and 430, the upper stage includes the display or touch panel and is moved toward the substrate support so the display or touch panel is placed on the adhesive. The second pressure of the vacuum chuck is no longer required to conform the substrate to the support surface (the upper stage can sufficiently conform the substrate to the support surface). It is noted that vacuum balancing is not required if an electrostatic chuck is used as the holding mechanism.

Optionally, the chamber pressure may be released after the adhesive is cured, as shown in step 450. The vacuum or force exerted on the substrate is optionally maintained at step 450.

In one or more embodiments, the method includes attaching a rear panel comprising at least one of a structural support for the substrate, a decorative panel, or a laminate structure. In embodiments in which a display panel is applied in steps 420, 430 and such display panel is an LCD display panel, the method may include attaching a backlight unit (BLU) to the CLD display panel rear panel at step 460. In one or more embodiments, where the display panel is an OLED display or a touch panel is applied in steps 420, 430, the method includes attaching a structural support in the form of a frame to the display panel or touch panel using a second adhesive, at step 460. At step 460, the vacuum or force exerted on the substrate is optionally maintained. After attachment, at step 470, the vacuum or force exerted on the substrate is released and the resulting system is configured to mount the vehicle interior system in a vehicle. Optionally, after the rear panel is adhered to the second major surface of the substrate, the method includes restoring the first pressure to the initial pressure and reapplying the second pressure via the vacuum chuck. In one or more embodiments, attaching of the rear panel to the substrate comprises carrying and placing the rear panel on the substrate using the positioning device, and when placing the rear panel on the substrate, the deformable engagement surface temporarily deforms with the rear panel as the rear panel conforms to the substrate. In one or more embodiments, attaching of the rear panel to the substrate comprises carrying and placing the rear panel on the substrate using the positioning device, and when attaching a frame to the rear panel, the deformable engagement surface temporarily deforms with the frame as the frame conforms to the rear panel. In one or more embodiments, structural adhesive is used to attach the rear panel. The structural adhesives may include, but not limited to, an adhesive selected from one of more of the categories: (a) Toughened Epoxy (for example, Masterbond EP21TDCHT-LO, 3M Scotch Weld Epoxy DP460 Off-white); (b) Flexible Epoxy (for example, Masterbond EP21TDC-2LO, 3M Scotch Weld Epoxy 2216); (c) Acrylics and/or Toughened Acrylics (for example, LORD Adhesive 403, 406 or 410 Acrylic adhesives with LORD Accelerator 19 or 19 GB w/LORD AP 134 primer, LORD Adhesive 850 or 852/ LORD Accelerator 25 GB, Loctite HF8000, Loctite AA4800); (d) Urethanes (for example, 3M Scotch Weld Urethane DP640 Brown, Sikaflex 552 and Polyurethane (PUR) Hot Melt adhesives such as, Technomelt PUR 9622-02 UVNA, Loctite HHD 3542, Loctite HHD 3580, 3M Hotmelt adhesives 3764 and 3748); and (e) Silicones (Dow Corning 995, Dow Corning 3-0500 Silicone Assembly adhesive, Dow Corning 7091, SikaSil-GP). In some cases, structural adhesives available as sheets or films (for example, but not limited to, 3M Structural adhesive films AF126-2, AF 163-2M, SBT 9263 and 9214, Masterbond FLM36-LO) may be utilized. In some cases, structural adhesives are available in sheet format (such as B-staged epoxy adhesives) may be utilized to simplify the process. Furthermore, pressure sensitive structural adhesives such as 3M VHB tapes may be utilized. In such embodiments, utilizing a pressure sensitive adhesive allows for the curved glass substrate to be bonded to the frame without the need for a curing step. In case of liquid adhesive, a dispensing mechanism may be provided in the laminator along with spot curing (via heat, infrared, or UV).

In one or more embodiments the shape of the support surface can be controlled to achieve a desired shape or radius of curvature for the vehicle interior system. In one or more embodiments of the method, the substrate is a glass substrate comprising an average thickness between the first major surface and the second major surface in a range from 0.05 mm to 2 mm. In one or more embodiments, the maximum thickness of the glass substrate measured between the first and second major surfaces is less than or equal to 1.5 mm, or in a range from about 0.3 mm to 0.7 mm.

In one or more embodiments, the vehicle interior component laminating system and the method for forming a vehicle interior system described herein perform the curving (i.e., cold-forming) step and display lamination in a single step, thereby reducing the need for two separate processes. This reduces cycle time and allows for a simpler operation. Without being bound by theory, lamination is performed under vacuum conditions, which eliminates the step of removing air bubbles from any adhesive used. In addition, the laminating system may also include heaters to in-situ thermally cure the optically clear adhesives. Optical and/or laser sensors can be leveraged for quick alignment of components (between upper and lower stage) before lamination. In addition, the laminating system may be fitted with robotic glue gun to dispense structural adhesive (instead of structural sheet tape) inside the chamber. The provided heaters could be utilized to cure the structural adhesives. Further, the use of a vacuum chamber can reduce glass breakage during bending.

A fourth aspect of this disclosure pertains to a method of forming a vehicle interior system that uses a piezoelectric-based cold form module frame to dynamically change the curvature of the surface of the system to achieve a desired function, appearance or attribute. In one or more embodiments, the module frame uses piezoelectric-based actuators, bending sensors, and a programmable logic controller (PLC). The piezoelectric actuators are precision electromechanical devices that convert electrical energy directly into motion with high speed, force and high resolution. Bending sensors converts change in strain to change in resistance (similar to strain gauge). Both piezoelectric actuators and bending sensors are connected to the programmable logic controller. The piezoelectric actuators and bending sensors could be utilized to change the curvature and/or position of the vehicle interior system. Without being bound by theory, it is believed that piezoelectric actuators can control motion more precisely than mechanical actuators. In addition, it is believed that bending sensors provide real-time feedback to the piezoelectric actuators to correct for any local distortion or warp.

In some embodiments, the piezoelectric actuators and bending sensors could be used to dynamically change shape of the vehicle interior system, and/or bring the display components or the entire system in and out of the plane of the underlying base (e.g., the dashboard base, steering wheel base, center console base and the like).

In one or more embodiments, the piezoelectric-based frame could be utilized to change the angle of the vehicle interior system (or the display module) to minimize light reflection from the light from the exterior of the vehicle.

In one or more embodiments, piezoelectric-based frame could be utilized to dynamically change the angle of vehicle glazing (or windows) to reduce the aerodynamic drag coefficient during driving.

Figure 10:
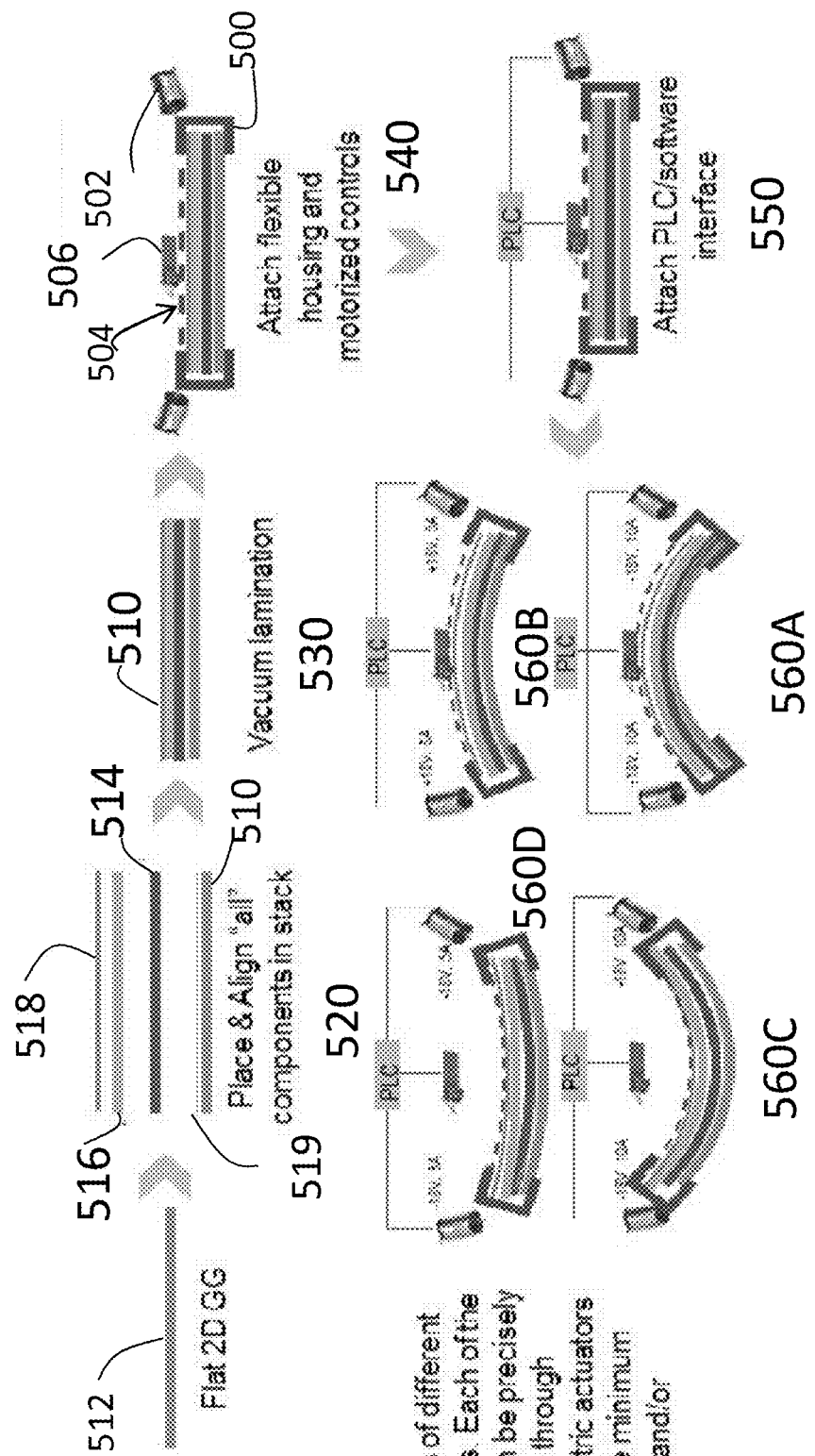
FIG. 10 illustrates a method of forming a curved vehicle display, according to one or more embodiments.

FIG. 10 illustrates a piezoelectric-based cold form module frame 500 and the method of forming a vehicle interior system using such module frame. The module frame is installed as a perimeter frame around a display stack 518 which includes a glass substrate 512, a display panel (e.g., flexible LCD, OLED and the like) 514, optional back light unit (BLU) (in the case of LCD) 516, and back frame (flexible) 518. One or more adhesive layers 519 may be used to bond the display stack together. The module frame 510 holds the display stack 510 together around the edges forming at least a partial perimeter around the display stack. The module frame is attached with series of piezoelectric-based bending actuators 502. The back frame 518 of the display stack is attached with an array of bending sensors 504 that covert bending strain to an electrical signal (through change in resistance). Based on the electrical signal the PLC 504 provides feedback to one or more bending actuators 502 to achieve a desired uniform curvature (with minimal distortion or warpage). The piezoelectric-based cold form module frame 500 can be used to change the shape of the display stack 510 from flat (or 2D) to curved (or 3D, either concave or convex) precisely, rapidly, and with high force.

The fourth aspect of this disclosure pertains to a method of forming a curved vehicle display that uses a piezoelectric-based cold form module frame. In one or more embodiments, the method includes positioning a glass substrate on a support surface, and attaching a back panel to the glass substrate via an adhesive, wherein the glass substrate, the adhesive, and the back panel form a laminate structure (step 520). In one or more embodiments, the method includes bending the laminate structure using a plurality of piezoelectric bending actuators on a back panel side of the laminate structure (steps 560A-560D), wherein the bending of the laminate structure occurs below a glass transition temperature of the glass substrate, and wherein the laminate structure has a first radius of curvature after bending, and the support surface assumes a curved surface shape to conform to the first radius of curvature of the laminate structure.

In one or more embodiments, the step of bending of the laminate structure includes cold-forming the stack with the piezoelectric bending actuators that are disposed on the support structure. In one or more embodiments, the bending actuators are disposed on the exposed surface of the support structure, as shown in step 540. In one or more embodiments, the piezoelectric bending actuators comprise at least one position sensor or strain gauge. In one or more embodiments, the method includes measuring a signal from the at least one position sensor or strain gauge, wherein the signal is used measure a local bending radius of the stack. In one or more embodiments, the method includes transmitting the signal to a controller having a processor, and controlling the cold forming via the controller based on feedback from the signal.

In one or more embodiments, the glass substrate has a first major surface and a second major surface opposite the first major surface, wherein the first major surface faces the support surface. In one or more embodiments, the glass substrate with an average thickness between the first major surface and the second major surface in a range from 0.05 mm to 2 mm. In one or more embodiments, the support surface is flexible and able to have a three-dimensional or curved surface shape. In one or more embodiments, the adhesive is disposed on the second major surface of the glass substrate.

In one or more embodiments, the method includes attaching a support structure to the back panel to form a stack comprising the glass substrate, the adhesive, the back panel, and the support structure as shown in steps 520 and 530. The support structure used in one or more embodiments may include a frame for mounting the vehicle interior system in a vehicle. In one or more embodiments, the back panel may include a liquid crystal matrix and one or more decorative layers. In one or more embodiments, the back panel may include a display panel (which may include an LCD, OLED display, transmissive display or reflective display) or a touch panel, or the combination of a display and touch panel. In one or more embodiments, the support structure may include a backlight unit for the display unit or a frame.

In one or more embodiments, the method includes placing the laminate in a chamber, lowering the pressure in the chamber and partially curing the adhesive, prior to cold forming. In one or more embodiments, the method includes fully thermally curing the adhesive after cold forming the laminate structure.

The fifth aspect of this disclosure pertains to a method of forming a curved vehicle display that uses dual-stage adhesive curing, and one or both a flexible vacuum chuck and die mechanism, and including piezoelectric bending actuators and sensors (which may include the piezoelectric-based cold form module frame described herein). Embodiments of this method provide a low-cost solution to provide a curved vehicle display in which a glass substrate and display panel are cold-formed in a single step. In one or more embodiments, the glass substrate and display panel are aligned in a stack. The stack is laminated using a vacuum laminator or via a roll laminator to form a laminate structure. An optically clear adhesive is used to laminate the glass substrate and the display panel; however, the adhesive is only partly cured in this step. As the adhesive is not fully cured, the glass substrate and the display panel act as individual components during subsequent cold-forming (instead of as a single unit). The adhesive in the curved laminated structure is then fully cured. Without being bound by theory, it is believed that embodiments of the method prevent bending stress in the adhesive layer, which eliminates optical distortion in the display area. The lack of optical distortion provides a curved vehicle display exhibiting substantially uniform color, as described herein.

Optionally, the laminated structure is placed in the piezoelectric-based cold form module frame described herein for cold-forming (after partially curing the adhesive layer but before fully curing the adhesive layer). Accordingly, the laminate structure is cold-formed to a curved shape using the piezoelectric-based cold form module frame.

In one or more embodiments, the laminated structure with the partly cured adhesive layer is placed on a vacuum chuck (which may be flexible) such that the glass substrate is in contact with the chuck. In such embodiments, the vacuum chuck cold-forms the laminated structure.

Position sensors may be used to provide feedback on the local bending radius of the cold-formed laminate which is then fed to the PLC and software interface. The interface provides feedback to bending actuators to achieve a desired curved shape. Thereafter, the adhesive layer is fully thermally cured.

Figure 11:
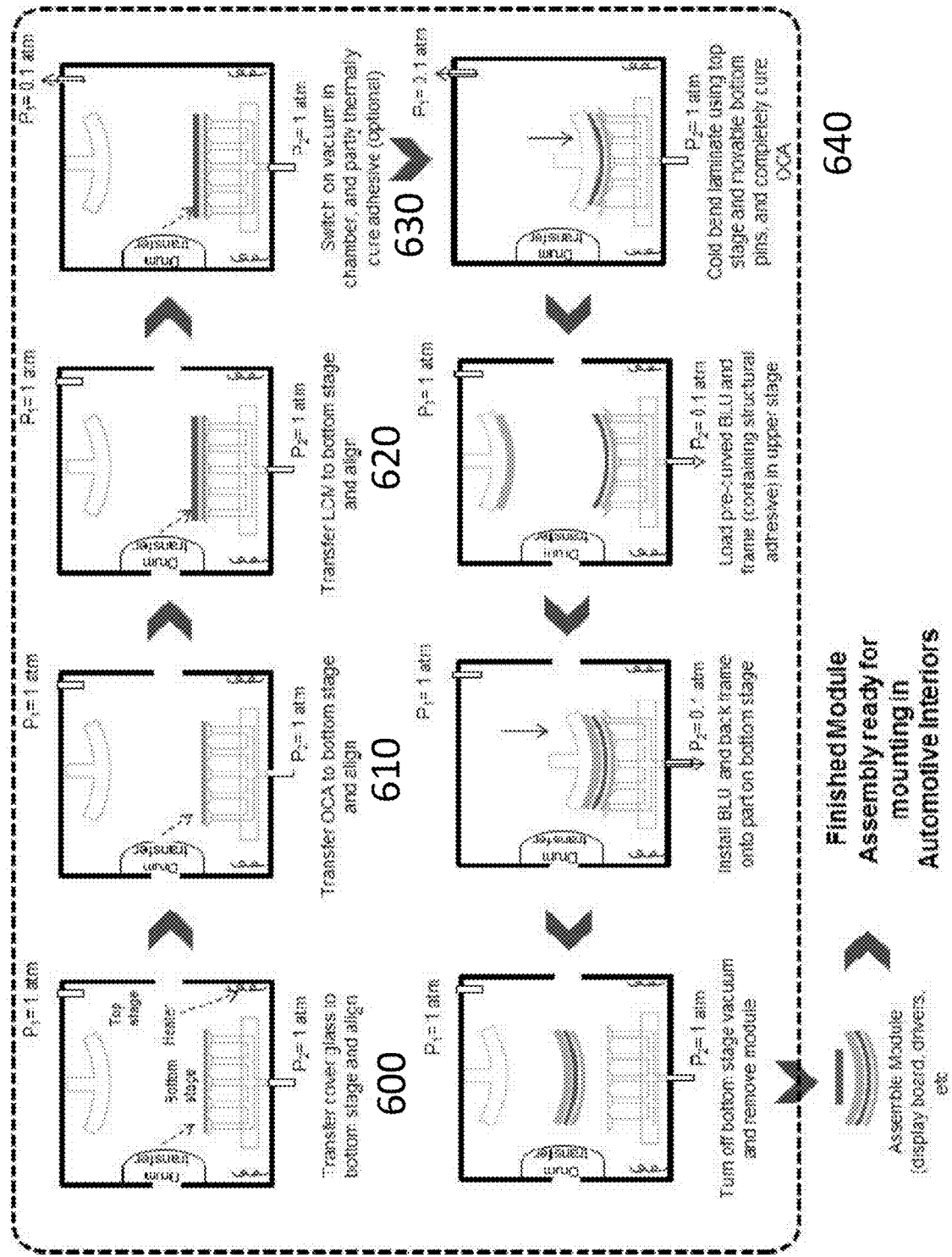
FIG. 11 illustrates a method of forming a curved vehicle display, according to one or more embodiments.
Figure 12:
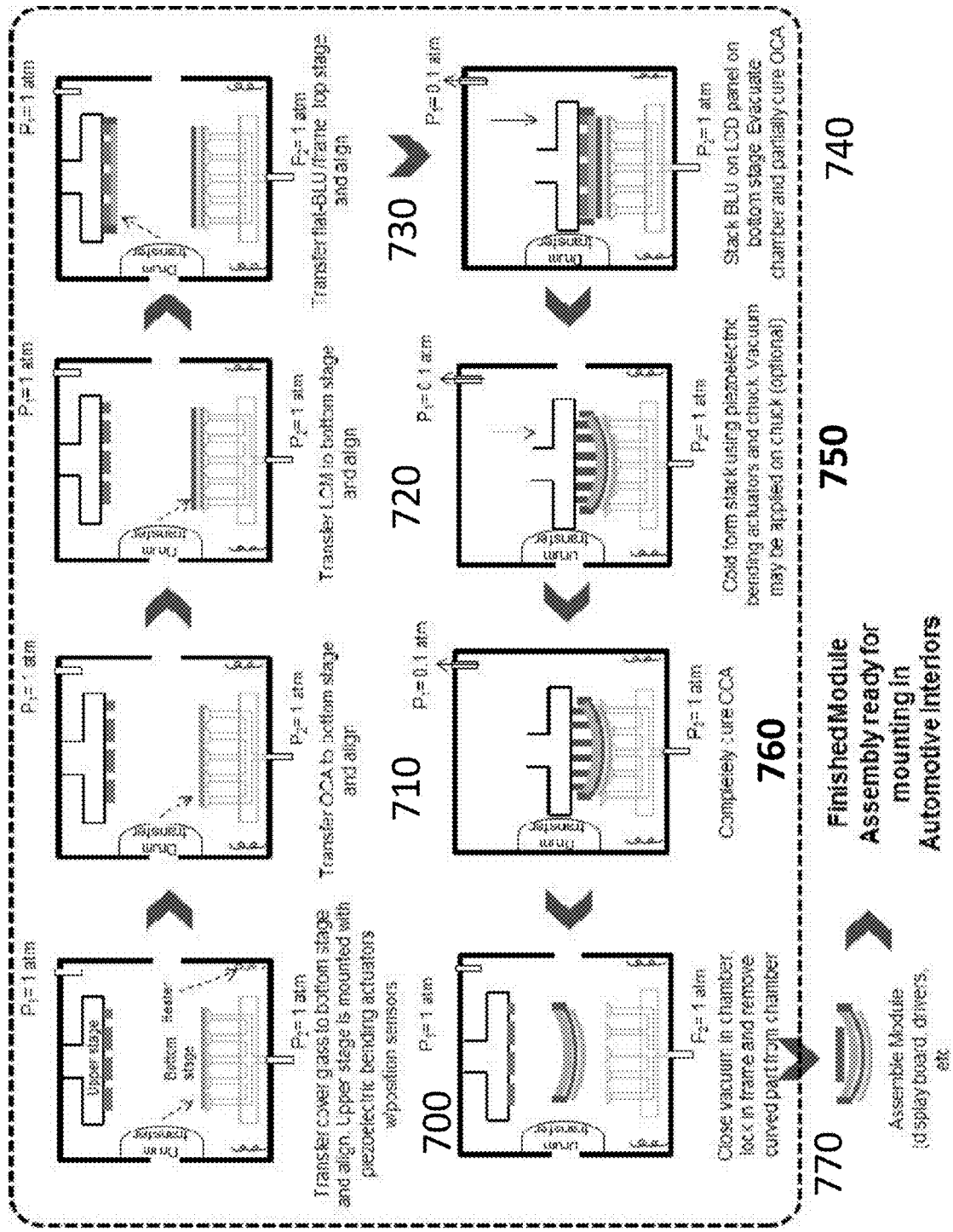
FIG. 12 illustrates a method of forming a curved vehicle display, according to one or more embodiments.
Figure 13:
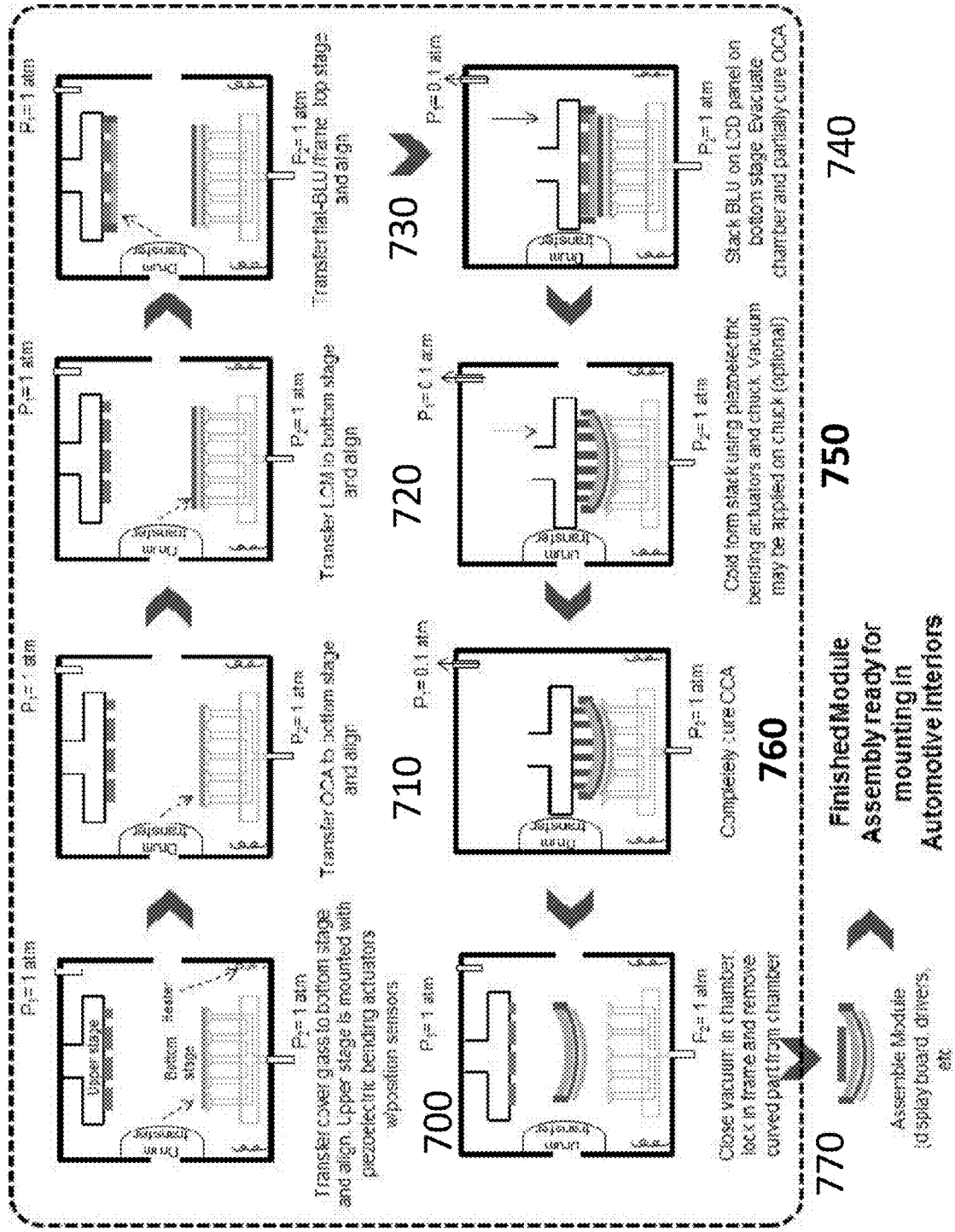
FIG. 13 illustrates a method of forming a curved vehicle display, according to one or more embodiments.

Referring to FIG. 11, the method of forming a curved vehicle display is illustrated. In step 600, positioning a glass substrate having a first major surface and a second major surface opposite the first major surface on a deformable surface of a platform with the first major surface facing the deformable surface, in step 610 providing an adhesive to the second major surface of the glass substrate, in step 620 attaching a display panel to the glass substrate via the adhesive on the second major surface, and in step 630 forming a laminate structure comprising the glass substrate, the adhesive, and the display panel. In one or more embodiments, forming the laminate structure includes partially curing the adhesive after attaching the display panel to the glass substrate and before cold bending the laminate structure.

In one or more embodiments, the method includes in step 640 cold bending the laminate structure by applying a curved surface of a die to a display-unit-side of the laminate structure and forming a curved laminate structure. In one or more embodiments, the curved surface of the die comprises a first radius of curvature, and the deformable surface of the platform deforms to accommodate the cold bending of the laminate structure.

In step 660, the method includes applying a pre-curved backlight unit and/or a pre-curved frame to the display panel of the curved laminate structure.

In one or more embodiments, the platform is disposed within a chamber with a first pressure control mechanism configured to control an ambient pressure inside the chamber, and wherein the stage comprises a vacuum chuck with a second pressure control mechanism configured to control a vacuum level to provide suction at the deformable surface.

In one or more embodiments, while partially curing the adhesive after attaching the display panel, the ambient pressure within the chamber is decreased from an initial pressure to a low pressure. The initial pressure may be about 1 atm and the low pressure is less than 1 atm (e.g., about 0.1 atm).

In one or more embodiments, after applying the curved surface of the die for cold bending of the laminate structure, thermally curing the adhesive completely. In one or more embodiments, during or after cold bending the laminate structure, the method may include applying at least a partial vacuum to the vacuum chuck of the stage to hold the curved laminate structure in place on the stage; and removing the die from contact with the curved laminate structure.

In one or more embodiments, the method includes maintaining the partial vacuum of the vacuum chuck until the pre-curved backlight unit and the pre-curved frame are attached to the curved laminate structure.

In the embodiments illustrated in FIG. 11, the piezoelectric-based cold form module frame is used to cold-form the laminate structure. As shown in step 700, the glass substrate is first placed on a flat vacuum chuck (which may be flexible). In step 710, an adhesive layer is applied to the glass substrate and in step 720 a display panel is disposed on the glass substrate such that the adhesive layer is between the glass substrate and the display panel. In one or more embodiments, the method includes applying a backlight unit and/or a frame to the display panel. As shown in FIG. 11, the glass substrate, display panel, and backlight unit or frame are flat and not curved. In step 720, the flat backlight unit or frame is placed and aligned on an upper stage of a chamber (as described herein); additionally, piezoelectric bending actuators and position sensors are attached to the backlight unit or frame. As shown in step 740, the upper stage is lowered so that backlight unit or frame is assembled on top of display panel. Optionally, the adhesive is then partially cured in step 740. Without being bound by theory, partial curing of the adhesive layer provides a laminated structure but the glass substrate and the display panel behaves as two distinct or isolated layers. The method includes in step 750 cold-forming the laminated structure using the flexible vacuum chuck under the glass substrate, and the piezoelectric bending actuators with position sensors (or piezoelectric based cold-form module frame). In one or more embodiments, the method includes using the position sensors to provide feedback on the local bending radius, and providing that feedback to the PLC/software interface in communication with the position sensors and actuators. The interface provides feedback to bending actuators to achieve the desired shape. In step 760, the adhesive layer is then fully cured using thermal heaters. In step 770, the vacuum in the chamber and vacuum chuck are released. The resulting curved vehicle display from step 770 is then removed from the chamber and PCBs and driver boards are attached. The finished curved vehicle display is then ready for mounting in vehicle interiors (or other applications).

The embodiments of the methods of forming a vehicle interior system, and the vehicle interior component laminating system described herein provide a curved vehicle display that exhibits substantially uniform color, as also described herein. In particular, when the display module of such displays emits a light, the light transmitted through the glass substrate has a substantially uniform color (as described herein). In one or more embodiments, substantially uniform color may be exhibited along 75% or more, 80% or more, 85% or more, 90% or more, 95% or more, 99% or more, or the entire surface area of the first surface 142. In one or more embodiments, the uniform color is present at various viewing angles α. For example, the uniform color is present when the viewing angle is normal with respect to a center point 200. In one or more embodiments, the uniform color is exhibited by the curved vehicle display 130 when viewed at a viewing angle (with respect to the center point 200) that is in a range from normal to 60 degrees away from normal, from normal to 55 degrees away from normal, from normal to 50 degrees away from normal, from normal to 45 degrees away from normal, from normal to 40 degrees away from normal, from normal to 35 degrees away from normal, from normal to 30 degrees away from normal, from normal to 25 degrees away from normal, from normal to 20 degrees away from normal, from normal to 15 degrees away from normal, or from normal to 10 degrees away from normal. In one or more embodiments, the light is emitted from a light source in the display module. For example, the light source may be any one of light-emitting diodes (LEDs), an electroluminescent panel (ELP), cold cathode fluorescent lamps (CCFLs), hot cathode fluorescent lamps (HCFLs), and external electrode fluorescent lamps (EEFLs). In one or more embodiments, the display is an OLED display and the light is emitted from such display.

Aspect (1) of this disclosure pertains to a method of forming a curved vehicle display comprising: providing a substrate having a first major surface and a second major surface opposite the first major surface; positioning the substrate on a support surface, the first major surface facing the support surface; conforming the first major surface of the substrate to the support surface; and attaching a rear panel on the second major surface of the substrate while the first major surface is in conforming contact with the support surface, the attaching comprising curing a first adhesive between the rear panel and the second major surface while an ambient environment of the first adhesive is subjected to a first vacuum, wherein the support surface comprises a first radius of curvature.

Aspect (2) of this disclosure pertains to the method of Aspect (1), wherein the first radius of curvature is 100 mm or greater.

Aspect (3) of this disclosure pertains to the method of Aspect (1) or Aspect (2), wherein the conformed first major surface comprises a second radius of curvature that is within 10% of the first radius of curvature.

Aspect (4) of this disclosure pertains to the method of any one of Aspects (1) through (3), wherein the support surface comprises a holding mechanism configured to temporarily hold the substrate on the support surface, and the substrate is at least partially conformed to the support surface via the holding mechanism.

Aspect (5) of this disclosure pertains to the method of Aspect (4), wherein the holding mechanism is a vacuum chuck or an electrostatic chuck.

Aspect (6) of this disclosure pertains to the method of any one of Aspects (1) through (5), wherein the rear panel comprises at least one of a structural support for the substrate, a decorative panel, a laminate structure, and a display panel.

Aspect (7) of this disclosure pertains to the method of Aspect (6), further comprising, when the rear panel comprises a display panel, attaching a backlight unit (BLU) to the rear panel.

Aspect (8) of this disclosure pertains to the method of any one of Aspects (1) through (7), further comprising attaching a frame to the rear panel using a second adhesive, the frame being configured to mount the vehicle interior system in a vehicle.

Aspect (9) of this disclosure pertains to the method of any one of Aspects (1) through (8), wherein the first adhesive is an optically clear adhesive (OCA) and is applied while the first major surface of the substrate is in conforming contact with the support surface.

Aspect (10) of this disclosure pertains to the method of any one of Aspects (1) through (9), wherein the positioning of the substrate on the support surface comprises carrying and placing the substrate by a positioning device that is configured to align the substrate with the support surface.

Aspect (11) of this disclosure pertains to the method of Aspect (10), wherein the positioning device comprises a deformable engagement surface, and wherein, when placing the substrate on the support surface, the deformable engagement surface temporarily deforms with the substrate as the substrate conforms to the support surface.

Aspect (12) of this disclosure pertains to the method of Aspect (11), wherein the attaching of the rear panel to the substrate comprises carrying and placing the rear panel on the substrate using the positioning device, and when placing the rear panel on the substrate, the deformable engagement surface temporarily deforms with the rear panel as the rear panel conforms to the substrate.

Aspect (13) of this disclosure pertains to the method of Aspect (11), wherein the attaching of the rear panel to the substrate comprises carrying and placing the rear panel on the substrate using the positioning device, and when attaching a frame to the rear panel, the deformable engagement surface temporarily deforms with the frame as the frame conforms to the rear panel.

Aspect (14) of this disclosure pertains to the method of any one of Aspects (1) through (13), wherein the support surface comprises a third radius of curvature.

Aspect (15) of this disclosure pertains to the method of Aspect (14), wherein the first radius of curvature and the third radius of curvature are each radii about different axes of curvature.

Aspect (16) of this disclosure pertains to the method of Aspect (14) or Aspect (15), wherein the conformed first major surface further comprises a fourth radius of curvature that is within 10% of the third radius of curvature.

Aspect (17) of this disclosure pertains to the method of any one of Aspects (1) through (16), wherein, when curing the first adhesive, a pressure of the vacuum is 0.1 atmospheres.

Aspect (18) of this disclosure pertains to the method of Aspect (5), wherein, when the support surface comprises a vacuum chuck, a second pressure of the vacuum chuck is controllable independently of a first pressure of the first vacuum.

Aspect (19) of this disclosure pertains to the method of Aspect (18), further comprising: reducing the first pressure from an initial pressure to a reduced pressure state while curing the first adhesive, and increasing the second pressure of the vacuum chuck to be greater than the first pressure while curing the first adhesive.

Aspect (20) of this disclosure pertains to the method of Aspect (19), wherein the ambient pressure is reduced to 0.1 atmospheres in the reduced pressure state.

Aspect (21) of this disclosure pertains to the method of Aspect (19) or Aspect (20), further comprising: after the rear panel is adhered to the second major surface of the substrate, restoring the first pressure to the initial pressure and reapplying the second pressure via the vacuum chuck.

Aspect (22) of this disclosure pertains to the method of Aspect (18), further comprising: switching the pressure values of the first and second pressures during curing of the first adhesive.

Aspect (23) of this disclosure pertains to the method of any one of Aspects (1) through (22), wherein a shape of the support surface can be controlled to achieve a desired shape or radius of curvature for the vehicle interior system.

Aspect (24) of this disclosure pertains to the method of Aspect (5), wherein, when the support surface is an electrostatic chuck, the force applied to the substrate comprises an electrostatic force applied to the first major surface of the substrate.

Aspect (25) of this disclosure pertains to the method of any one of Aspects (1) through Aspect (24), wherein the substrate comprises a glass substrate comprising an average thickness between the first major surface and the second major surface in a range from 0.05 mm to 2 mm.

Aspect (26) of this disclosure pertains to the method of Aspect (25), wherein a maximum thickness of the glass substrate measured between the first and second major surfaces is less than or equal to 1.5 mm.

Aspect (27) of this disclosure pertains to the method of Aspect (25), wherein the maximum thickness of the glass substrate measured between the first and second major surfaces is 0.3 mm to 0.7 mm.

Aspect (28) of this disclosure pertains to a vehicle interior component laminating system comprising: a chamber configured to receive components of a vehicle interior system, a first pressure of an interior of the chamber being controllable; a curved support surface disposed in a lower part of the chamber; and an upper stage disposed in an upper part of the chamber, the upper stage being configured to hold components of the vehicle interior system, wherein the upper stage and the curved support surface are movable relative to one another such that the upper stage can position the components of the vehicle interior system on the curved support surface for cold-forming the vehicle interior system.

Aspect (29) of this disclosure pertains to the vehicle interior component laminating system of Aspect (28), wherein the curved support surface has a radius of curvature corresponding to a desired radius of curvature of the vehicle interior system.

Aspect (30) of this disclosure pertains to the vehicle interior component laminating system of Aspect (28) or Aspect (29), wherein the curved support surface comprises a vacuum chuck, a second pressure of the vacuum chuck being controllable separately from the first pressure of the chamber.

Aspect (31) of this disclosure pertains to the vehicle interior component laminating system of Aspect (28) or Aspect (29), wherein the curved support surface comprises an electrostatic chuck, an electrostatic force of the electrostatic chuck being controllable separately from the first pressure of the chamber.

Aspect (32) of this disclosure pertains to the vehicle interior component laminating system of Aspect (30) or Aspect (31), further comprising a heater to thermally cure an adhesive of the vehicle interior system.

Aspect (33) of this disclosure pertains to the vehicle interior component laminating system of any one of Aspects (28) through (32), wherein the upper stage comprises a flexible surface configured to conform to a curved shape of the components of the vehicle interior system when curved by the curved support surface.

Aspect (34) of this disclosure pertains to a method of forming a curved vehicle display comprising: positioning a glass substrate on a support surface, the glass substrate having a first major surface and a second major surface opposite the first major surface, the first major surface facing the support surface, the support surface being flexible and able to have a three-dimensional or curved surface shape; attaching a back panel to the glass substrate via an adhesive on the second major surface of the glass substrate, wherein the glass substrate, the adhesive, and the back panel form a laminate structure; bending the laminate structure using a plurality of piezoelectric bending actuators on a back panel side of the laminate structure, wherein the bending of the laminate structure occurs below a glass transition temperature of the glass substrate, wherein the laminate structure having a first radius of curvature after bending, and the support surface assumes a curved surface shape to conform to the first radius of curvature of the laminate structure.

Aspect (35) of this disclosure pertains to the method of Aspect (34), further comprising attaching a support structure to the back panel to form a stack comprising the substrate, the adhesive, the back panel, and the support structure, wherein the support structure comprises a frame for mounting the vehicle interior system in a vehicle.

Aspect (36) of this disclosure pertains to the method of Aspect (34), wherein the back panel comprises at least one of a liquid crystal matrix and one or more decorative layers.

Aspect (37) of this disclosure pertains to the method of Aspect (34), wherein the back panel is a display panel.

Aspect (38) of this disclosure pertains to the method of any one of Aspects (34) through (37), wherein the support structure comprises at least one of a backlight unit for the display panel and a frame.

Aspect (39) of this disclosure pertains to the method of any one of Aspects (34) through (38), wherein the bending of the laminate structure by the piezoelectric bending actuators comprises cold forming the stack, the piezoelectric bending actuators being disposed on a back side of the support structure.

Aspect (40) of this disclosure pertains to the method of any one of Aspects (34) through (39), wherein the piezoelectric bending actuators comprise at least one position sensor or strain gauge.

Aspect (41) of this disclosure pertains to the method of Aspect (40), further comprising measuring a signal from the at least one position sensor or strain gauge, wherein the signal is used measure a local bending radius of the stack.

Aspect (42) of this disclosure pertains to the method of Aspect (39), further comprising: transmitting the signal to a controller having a processor; and controlling the cold forming via the controller based on feedback from the signal.

Aspect (43) of this disclosure pertains to the method of any one of Aspects (34) through (42), further comprising: lowering a pressure in a chamber containing the laminate structure; and partially curing the adhesive prior to cold forming.

Aspect (44) of this disclosure pertains to the method of any one of Aspects (34) through (43), further comprising fully thermally curing the adhesive after cold forming the laminate structure.

Aspect (45) of this disclosure pertains to the method of any one of Aspects (34) through (44), wherein the glass substrate comprises an average thickness between the first major surface and the second major surface in a range from 0.05 mm to 2 mm.

Aspect (46) of this disclosure pertains to a method of forming a curved vehicle display comprising: providing a glass substrate having a first major surface and a second major surface opposite the first major surface; positioning the glass substrate on a deformable surface of a platform with the first major surface facing the deformable surface; providing an adhesive to the second major surface of the glass substrate; attaching a display panel to the glass substrate via the adhesive on the second major surface, forming a laminate structure comprising the glass substrate, the adhesive, and the display panel; cold bending the laminate structure by applying a curved surface of a die to a display-unit-side of the laminate structure, forming a curved laminate structure, the curved surface of the die comprising a first radius of curvature, wherein the deformable surface of the platform deforms to accommodate the cold bending of the laminate structure; and applying a pre-curved backlight unit and a pre-curved frame to the display panel of the curved laminate structure.

Aspect (46) of this disclosure pertains to the method of Aspect (45), further comprising partially curing the adhesive after attaching the display panel to the glass substrate and before cold bending the laminate structure.

Aspect (47) of this disclosure pertains to the method of Aspect (45) or Aspect (46), wherein the platform is disposed within a chamber with a first pressure control mechanism configured to control an ambient pressure inside the chamber, and wherein the stage comprises a vacuum chuck with a second pressure control mechanism configured to control a vacuum level to provide suction at the deformable surface.

Aspect (48) of this disclosure pertains to the method of Aspect (46) or Aspect (47), wherein, while partially curing the adhesive after attaching the display panel, the ambient pressure within the chamber is decreased from an initial pressure to a low pressure.

Aspect (49) of this disclosure pertains to the method of Aspect (48), wherein the initial pressure is 1 atm and the low pressure is 0.1 atm.

Aspect (50) of this disclosure pertains to the method of Aspect (47), further comprising, after applying the curved surface of the die for cold bending of the laminate structure, thermally curing the adhesive completely.

Aspect (51) of this disclosure pertains to the method of Aspect (50), further comprising: during or after cold bending the laminate structure, applying at least a partial vacuum to the vacuum chuck of the stage to hold the curved laminate structure in place on the stage; and removing the die from contact with the curved laminate structure.

Aspect (52) of this disclosure pertains to the method of Aspect (51), further comprising: maintaining the partial vacuum of the vacuum chuck until the pre-curved backlight unit and the pre-curved frame are attached to the curved laminate structure.

Aspect (53) of this disclosure pertains to a curved vehicle interior component formed according to any one of Aspects (34) through (52).

Aspect (54) of this disclosure pertains to a curved vehicle display comprising: a display module having a display surface; a curved glass substrate disposed on the display surface, the glass substrate comprising a first major surface, a second major surface having a second surface area, a minor surface connecting the first major surface and the second major surface, and a thickness in a range from 0.05 mm to 2 mm, wherein the second major surface comprises a first radius of curvature of 200 mm or greater, wherein, when the display module emits a light, the light transmitted through the glass substrate has a substantially uniform color along 75% or more of the second surface area, when viewed at a viewing angle at a distance of 0.5 meters from the second surface.

Aspect (55) of this disclosure pertains to the curved vehicle display of Aspect (54), the display surface is curved and has a second radius of curvature that is within 10% of the first radius of curvature.

Aspect (56) of this disclosure pertains to a curved vehicle display of Aspect (54) or (55), wherein substantially uniform color means the Delta E* is less than about 10, as measured using CIE L*a*b* color space and the equation $\Delta E^* = [\Delta L^{*2} + \Delta a^{*2} + \Delta b^{*2}]^{1/2}$.

Aspect (57) of this disclosure pertains to a curved vehicle display of any one of Aspects (54) through (56), wherein the viewing angle is within 45 degrees from normal as measured at a center point of the first major surface.

Aspect (58) of this disclosure pertains to a curved vehicle display of any one of Aspects (54) through (57), wherein the display comprises a light source selected from the group consisting of light-emitting diodes (LEDs), an electroluminescent panel (ELP), cold cathode fluorescent lamps (CCFLs), hot cathode fluorescent lamps (HCFLs), and external electrode fluorescent lamps (EEFLs).

Aspect (59) of this disclosure pertains to a curved vehicle display of any one of Aspects (54) through (58), wherein the display comprises an OLED display.

Aspect (60) of this disclosure pertains to a curved vehicle display of any one of Aspects (54) through (59), wherein the display module comprises a touch panel.

Aspect (61) of this disclosure pertains to a curved vehicle display of any one of Aspects (54) through (60), wherein a maximum thickness of the glass substrate measured between the first and second major surfaces is less than or equal to 1.5 mm.

Aspect (62) of this disclosure pertains to a curved vehicle display of any one of Aspects (54) through (61), wherein the maximum thickness of the glass substrate measured between the first and second major surfaces is 0.3 mm to 0.7 mm.

Aspect (63) of this disclosure pertains to a curved vehicle display of any one of Aspects (54) through (62), wherein the glass substrate comprises strengthened glass.

Aspect (64) of this disclosure pertains to a curved vehicle display of any one of Aspects (54) through (63), wherein at least one of an anti-glare coating, an anti-reflection coating, a tactile layer, and an easy-to-clean coating is disposed on the first major surface of the glass substrate.

Aspect (65) of this disclosure pertains to a vehicle interior system comprising a base having a surface; and the curved vehicle display of any one of Aspects (54) through (64).

Aspect (66) of this disclosure pertains to the vehicle interior system of Aspect (65), wherein the base comprises one of a center console base, a dashboard base and a steering wheel base.

Aspect (67) of this disclosure pertains to the vehicle interior system of Aspect (65), wherein the base comprises one of an arm rest, a pillar, a seat back, a floor board, a headrest, and a door panel.

It will be apparent to those skilled in the art that various modifications and variations can be made without departing from the spirit or scope of the invention.

What is claimed is:

1. A vehicle interior component laminating system comprising:
    a chamber configured to receive components of a vehicle interior system, a first pressure of an interior of the chamber being controllable;
    a curved support surface disposed in a lower part of the chamber; and
    an upper stage disposed in an upper part of the chamber, the upper stage comprising a flexible surface configured to hold components of the vehicle interior system in a substantially planar configuration and in a curved configuration,
    wherein the upper stage and the curved support surface are movable relative to one another such that the upper stage can position the components of the vehicle interior system on the curved support surface for cold-forming the vehicle interior system.

2. The system of claim 1, wherein the curved support surface has a radius of curvature corresponding to a desired radius of curvature of the vehicle interior system.

3. The system of claim 1, wherein the curved support surface comprises a vacuum chuck, a second pressure of the vacuum chuck being controllable separately from the first pressure of the chamber.

4. The system of claim 1, wherein the curved support surface comprises an electrostatic chuck, an electrostatic force of the electrostatic chuck being controllable separately from the first pressure of the chamber.

5. The system of claim 1, further comprising a heater to thermally cure an adhesive of the vehicle interior system.

6. The system of claim 1, wherein the flexible surface, in the curved configuration, is configured to conform to a curved shape of the components of the vehicle interior system when curved by the curved support surface.

7. The system of claim 1, wherein the chamber is configured to provide a first pressure as low as 0.1 atm.

8. The system of claim 3, wherein the second pressure of the vacuum chuck is controllable to be as low as 0.1 atm.

9. The system of claim 1, wherein a shape of the curved support surface is controllable to achieve a desired radius of curvature for the vehicle interior system.

10. The system of claim 9, wherein the shape of the curved support surface is controllable to produce a radius of curvature as low as 100 mm.

11. The system of claim 3, wherein the vacuum chuck is formed from a plastic material.

12. The system of claim 11, wherein the plastic material comprises at least one of polycarbonate, acrylonitrile butadiene styrene, polyvinyl chloride, or polyoxymethylene.

13. The system of claim 11, wherein the vacuum chuck comprises a coating on the curved support surface to minimize scratches on the components of the vehicle interior system.

14. The system of claim 3, wherein the vacuum chuck is formed from a metal.

15. The system of claim 14, wherein the metal comprises an aluminum or iron alloy.

16. The system of claim 14, wherein the vacuum chuck comprises a coating on the curved support surface to minimize scratches on the components of the vehicle interior system.

17. The system of claim 1, further comprising a drum configured to apply adhesive to the components of the vehicle interior system.

18. The system of claim 1, further comprising a robotic glue gun to dispense adhesive to the components of the vehicle interior system.

19. The system of claim 1, further comprising sensors configured to align the components of the vehicle interior system for lamination.

20. The system of claim 1, further comprising at least one of an infrared or ultraviolet light source positioned to accelerate curing of adhesive applied to the components of the vehicle interior system.

* * * * *